United States Patent
Kim et al.

(10) Patent No.: US 10,154,400 B2
(45) Date of Patent: Dec. 11, 2018

(54) ELECTRONIC DEVICE AND METHOD OF OPERATING SAME

(71) Applicant: Samsung Electronics Co., Ltd., Suwon-si (KR)

(72) Inventors: Chulkwi Kim, Yongin-si (KR); Jimin Kim, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 15/382,098

(22) Filed: Dec. 16, 2016

(65) Prior Publication Data

US 2017/0180920 A1 Jun. 22, 2017

(30) Foreign Application Priority Data

Dec. 16, 2015 (KR) .................. 10-2015-0180082

(51) Int. Cl.
| | |
|---|---|
| *H04B 7/00* | (2006.01) |
| *H04W 4/80* | (2018.01) |
| *H04W 76/25* | (2018.01) |
| *H04W 76/14* | (2018.01) |
| *H04M 1/725* | (2006.01) |

(52) U.S. Cl.
CPC ........... *H04W 4/80* (2018.02); *H04M 1/7253* (2013.01); *H04W 76/14* (2018.02); *H04W 76/25* (2018.02)

(58) Field of Classification Search
CPC . H04W 4/008; H04W 76/023; H04W 76/045; H04M 1/7253

USPC ........................................................ 455/41.3
See application file for complete search history.

(56) References Cited

U.S. PATENT DOCUMENTS

| | | | | |
|---|---|---|---|---|
| 7,962,186 | B2 * | 6/2011 | Cui ........................ | H01Q 1/243 455/575.7 |
| 8,416,198 | B2 * | 4/2013 | Rathnam ............. | G06F 3/03547 345/156 |
| 8,514,185 | B2 * | 8/2013 | Hotelling ................ | G06F 3/044 345/156 |
| 8,644,880 | B2 * | 2/2014 | Patrice ................. | G06K 7/0008 455/41.1 |
| 8,683,378 | B2 * | 3/2014 | Bull ....................... | G06F 3/0485 345/156 |
| 8,744,529 | B2 * | 6/2014 | Freund ................ | H04M 1/0206 455/566 |
| 8,749,493 | B2 * | 6/2014 | Zadesky ............... | G06F 3/0338 345/173 |
| 8,872,771 | B2 * | 10/2014 | Hotelling ................ | G06F 3/044 178/18.01 |
| 8,886,264 | B2 * | 11/2014 | Mori ..................... | G06F 1/1618 345/168 |
| 8,902,129 | B2 * | 12/2014 | Mitsunaga ............ | G06F 3/1423 345/1.1 |

(Continued)

FOREIGN PATENT DOCUMENTS

| KR | 20090077412 A | 7/2009 |
|---|---|---|
| KR | 20150028042 A | 3/2015 |

*Primary Examiner* — April G Gonzales

(57) ABSTRACT

An electronic device and a method of operating the same may include: detecting mounting of a first external device through first short range communication, outputting a first object corresponding to the first external device, detecting an approach of a second external device through second short range communication, and outputting a second object corresponding to the second external device.

20 Claims, 21 Drawing Sheets

(56) References Cited

U.S. PATENT DOCUMENTS

| | | | | |
|---|---|---|---|---|
| 8,923,935 B2* | 12/2014 | Jung | ............... | G06F 1/1624 |
| | | | | 455/575.4 |
| 9,014,755 B2* | 4/2015 | Patrice | ............. | G06K 19/07769 |
| | | | | 455/558 |
| 9,161,160 B2* | 10/2015 | Ikemoto | ................ | H04W 4/80 |
| 9,323,646 B2* | 4/2016 | Boisde | ............... | G06F 11/3648 |
| 9,354,751 B2* | 5/2016 | Fisher | ................ | G06F 3/044 |
| 9,367,151 B2* | 6/2016 | McKillop | ........... | G06F 3/03547 |
| 9,454,256 B2* | 9/2016 | Fisher | ................ | G06F 1/1626 |
| 2005/0125093 A1* | 6/2005 | Kikuchi | ............. | G06K 7/0008 |
| | | | | 700/213 |
| 2005/0274803 A1* | 12/2005 | Lee | ................ | G06K 7/0004 |
| | | | | 235/439 |
| 2006/0219776 A1* | 10/2006 | Finn | ................ | B60R 25/25 |
| | | | | 235/380 |
| 2008/0207282 A1* | 8/2008 | Schaffler | ............. | H01Q 1/243 |
| | | | | 455/575.3 |
| 2009/0036176 A1* | 2/2009 | Ure | ................ | G06F 3/044 |
| | | | | 455/575.3 |
| 2012/0028581 A1* | 2/2012 | Lee | ................ | H04M 1/0258 |
| | | | | 455/41.2 |
| 2013/0095757 A1* | 4/2013 | Abdelsamie | .......... | H04W 4/001 |
| | | | | 455/41.1 |
| 2014/0057563 A1* | 2/2014 | Salahshoor | ........... | H04W 84/20 |
| | | | | 455/41.2 |
| 2014/0057682 A1* | 2/2014 | Freund | ............... | H04M 1/0206 |
| | | | | 455/566 |
| 2014/0073252 A1* | 3/2014 | Lee | ................ | H04W 4/008 |
| | | | | 455/41.2 |
| 2014/0154987 A1* | 6/2014 | Lee | ................ | H04W 76/14 |
| | | | | 455/41.2 |

* cited by examiner

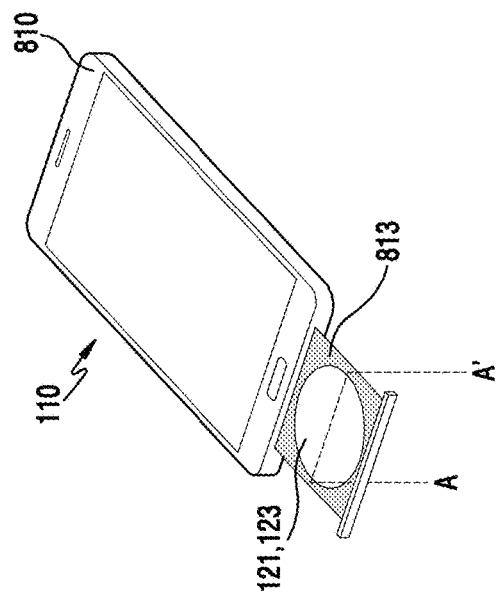
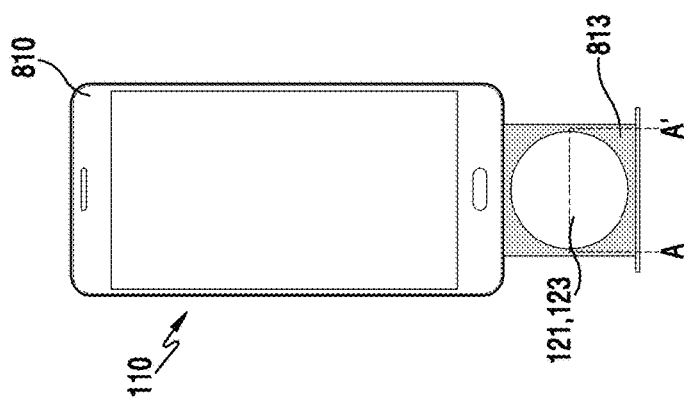
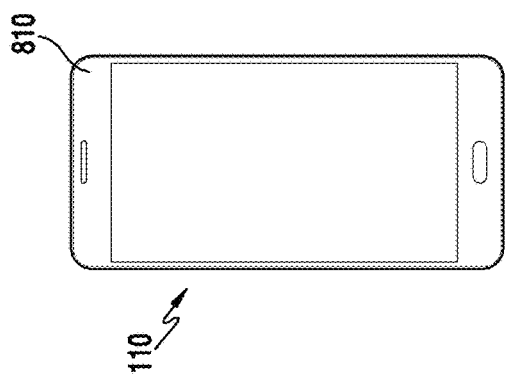
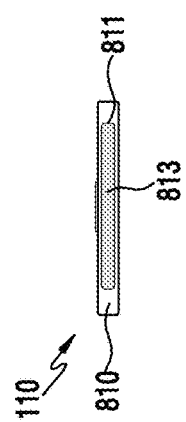

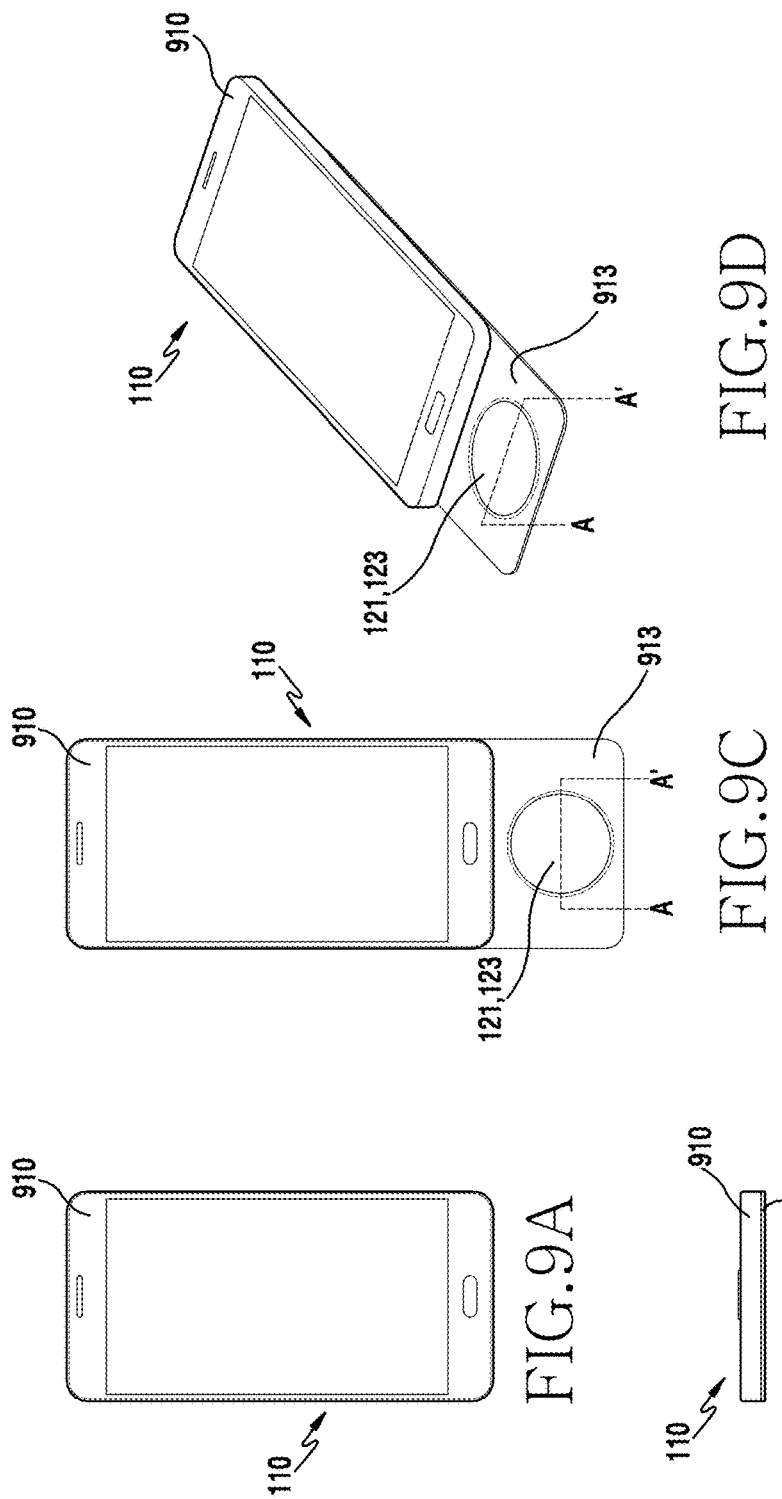

ELECTRONIC DEVICE AND METHOD OF OPERATING SAME

CROSS-REFERENCE TO RELATED APPLICATION(S) AND CLAIM OF PRIORITY

The present application is related to and claims the priority under 35 U.S.C. § 119(a) of Korean Application Serial No. 10-2015-0180082, which was filed in the Korean Intellectual Property Office on Dec. 16, 2015, the entire content of which is hereby incorporated by reference.

TECHNICAL FIELD

The present disclosure relates to an electronic device and a method of operating the same.

BACKGROUND

According to the development of technologies, various functions are added to electronic devices and complex functions are executed. For example, electronic devices may perform a mobile communication function, a data communication function, a data output function, a data storage function, an image photographing function, an audio recording function, and the like. The electronic device may store a plurality of predetermined screens. Further, based on a user's request, the electronic device may display one of the screens.

SUMMARY

However, the electronic device displays only a predetermined screen, so that various interactions may not be provided. That is, the electronic device has difficulty in diversely expressing various operations. Accordingly, there is a problem in that use efficiency of the electronic device and user convenience are low.

To address the above-discussed deficiencies, it is a primary object to provide an electronic device. The electronic device includes: a housing comprising an accommodation part; a first short range communication module configured to perform first short range communication with a first external device mounted on the accommodation part; and a second short range communication module configured to perform second short range communication with a second external device accumulated on the first external device.

In accordance with another aspect of the present disclosure, an electronic device is provided. The electronic device includes: a first short range communication module configured to perform first short range communication; a second short range communication module configured to perform second short range communication; a controller functionally connected to the first short range communication module and the second short range communication; and a display unit functionally connected to the controller, wherein the controller detects mounting of a first external device through first short range communication, outputs a first object corresponding to the first external device, detects an approach of a second external device through second short range communication, and outputs a second object corresponding to the second external device. In accordance with another aspect of the present disclosure, a method of operating an electronic device is provided. The method includes: detecting mounting of a first external device through first short range communication; outputting a first object corresponding to the first external device; detecting an approach of a second external device through second short range communication; and outputting a second object corresponding to the second external device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property, of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A-8D, 9A-9D, 10A-10D, 11A-11D, and 12 illustrate examples of an electronic device according to various embodiments;

DETAILED DESCRIPTION

Figure 1:
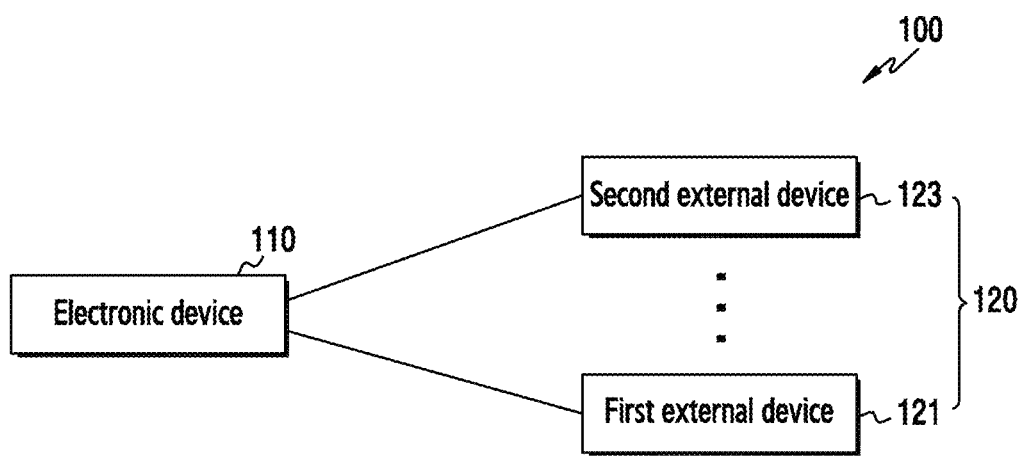
FIG. 1 illustrates a block diagram of a communication system according to various embodiments.

FIGS. 1 through 21B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, embodiments of the present disclosure will be described in detail with reference to the accompanying drawings. Here, it is noted that identical reference numerals denote the same structural elements in the accompanying drawings. The detailed description of known functions and structures will be omitted to avoid an unclearness of the subject matter of the present disclosure.

In the following description, the term "object" may refer to data of the electronic device for indicating a User Interface (UI) according to driving of the electronic device. At this time, the object may include at least one of display data and audio data. Further, the object may be equally applied to various functions in the electronic device or may be applied to at least one of the functions. For example, the object may be an entire screen or a character displayed on the screen. When the object is a character, the electronic device may change at least one of a facial expression, a motion, and a size of the character.

FIG. 1 is a block diagram illustrating a communication system according to various embodiments.

Referring to FIG. 1, a communication system 100 according to various embodiments may include an electronic device 110 and at least one external device 120. The electronic device 110 and the external device 120 may perform short-range communication. The short range communication may include, for example, Wi-Fi, wireless Local Area Network (LAN), Bluetooth, Near Field Communication (NFC), and Magnetic Secure Transmission (MST).

According to various embodiments, the electronic device 110 may accommodate the external device 120. At this time, the external device 120 may include a first external device 121 and a second external device 123. For example, the electronic device 110 may accommodate the first external device 121, and the second external device 123 may be accumulated on the first external device 121. Further, the electronic device 110 may directly communicate with the first external device 121 and may communicate with the second external device 123 through the first external device 121. Alternatively, the electronic device 110 may directly communicate with the first external device 121 and the second external device 123. At this time, the electronic device 110 may perform first short range communication with the first external device 121 and second short range communication with the second external device 123.

For example, the first short range communication and the second short range communication may be performed through the same scheme. The first short range communication and the second short range communication may be, for example, NFC. At least a part of a first frequency band an at least a part of a second frequency band may overlap each other. Alternatively, the first frequency band and the second frequency band may be separated from each other in a frequency domain. The first frequency band and the second frequency band may correspond to, for example, 13.56 MHz.

According to various embodiments, each external device 120 may store identification data. Here, the identification data of the first external device 121 and the identification data of the second external device 123 may be different. Further, each external device 120 may further store an object. At this time, the first external device 121 may store a first object, and the second external device 123 may store a second object. The first object and the second object may be the same or may be different.

Figure 2:
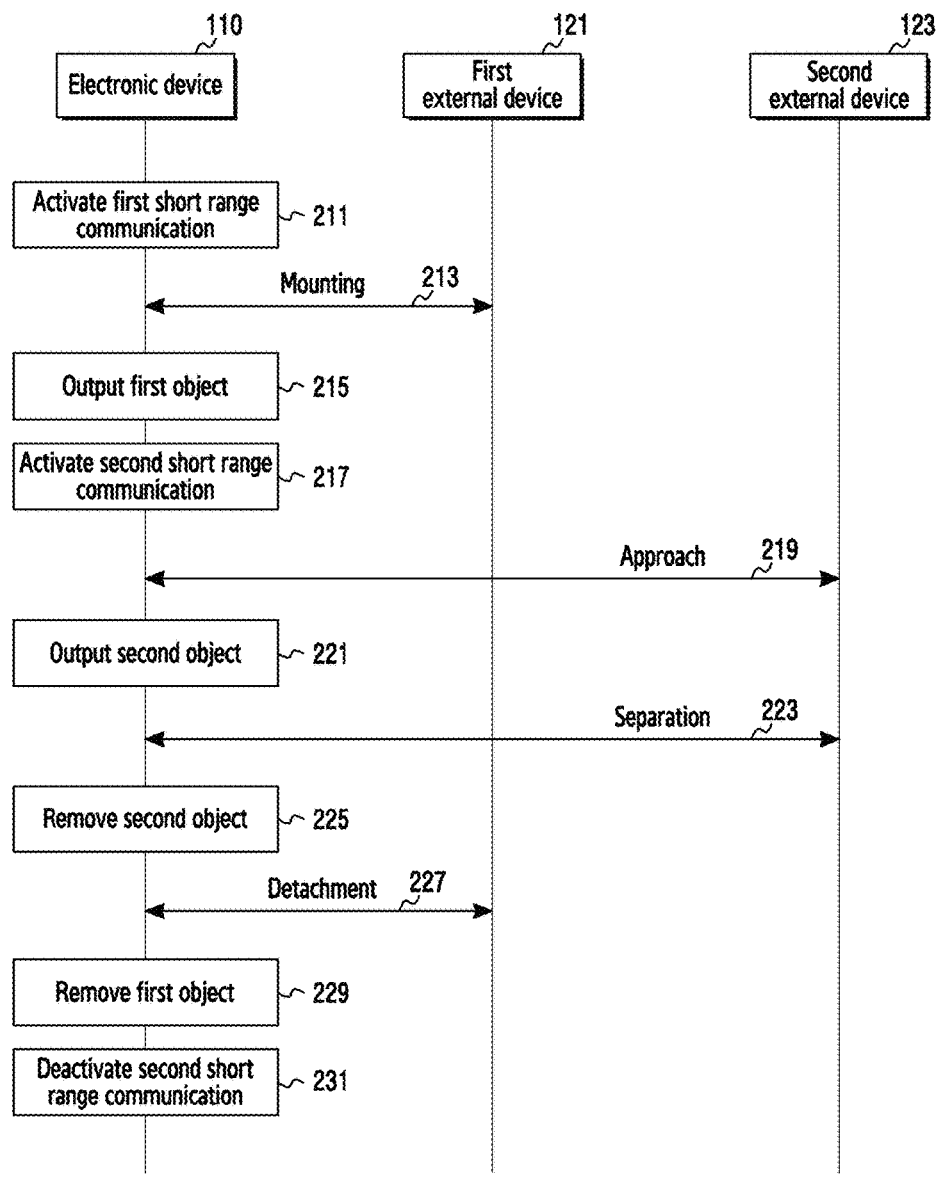
FIG. 2 is a flowchart illustrating a signal flow in a communication system according to various embodiments.

FIG. 2 is a flowchart illustrating a signal flow in a communication system according to various embodiments.

Referring to FIG. 2, in the communication system 100 according to various embodiments, the electronic device 110 may activate first short range communication in operation 211. For example, when the electronic device 110 is turned on, the electronic device 110 may continuously activate the first short range communication. Further, the electronic device 110 may maintain the activation of the first short range communication.

Next, the electronic device 110 may detect an attachment or a connection of the first external device 121 in operation 213. For example, the electronic device 110 may broadcast a search message through the first short range communication. When receiving the search message in response to the broadcasting, the first external device 121 may transmit a response message to the electronic device 110 through the first short range communication. Accordingly, the electronic device 110 and the first external device 121 may be connected to each other through the first short range communication. The response message may include identification data of the first external device 121.

Next, the electronic device 110 may output a first object according to the first external device 121 in operation 215. To output the first object, the electronic device 110 may detect the first Object. For example, when receiving the response message from the first external device 121, the electronic device 110 may detect the first object corresponding to the first external device 121. The electronic device 110 may download the first object from the first external device 121. Alternatively, the electronic device 110 may download the first object from a server. Further, the electronic device 110 may apply the first object according to at least one function.

Next, the electronic device 110 may activate second short range communication in operation 217. That is, when the first external device 121 is not detached from the electronic device 110, the electronic device 110 may activate the second short range communication. For example, the electronic device 110 may activate the second short range communication while maintaining the activation of the first short range communication.

Next, the electronic device 110 may detect an approach of the second external device 123 in operation 219. For example, the electronic device 110 may broadcast a search message through the second short range communication. When receiving the search message in response to the broadcasting, the second external device 123 may transmit a response message to the electronic device 110 through the second short range communication. Accordingly, the electronic device 110 and the second external device 123 may be connected to each other through the second short range communication. The response message may include identification data of the second external device 123.

Next, the electronic device 110 may output a second object according to the second external device 123 in operation 221. To output the second object, the electronic device 110 may detect the second object. For example, when receiving the response message from the second external device 123, the electronic device 110 may detect the second object corresponding to the second external device 123. The electronic device 110 may download the second object from the second external device 123. Alternatively, the electronic device 110 may download the second object from a server. Further, the electronic device 110 may apply the second object according to at least one function. For example, the function for the first object and the function for the second object may be the same or may be different. When the function for the first object and the function for the second object are the same, the electronic device 110 may combine the first object and the second object.

Next, the electronic device 110 may detect separation of the second external device 123 through the second short range communication in operation 223. That is, when the connection of the second short range communication between the electronic device 110 and the second external device 123 is released, the electronic device 110 may detect the separation of the second external device 123. Thereafter, the electronic device 110 may remove the second object in operation 225. At this time, the electronic device 110 may maintain the activation of the first short range communication and the second short range communication.

Next, the electronic device 110 may detect detachment of the first external device 121 through the first short range communication in operation 227. That is, when the connection between the electronic device 110 and the first external device 121 through the first short range communication is released, the electronic device 110 may detect the detachment of the first external device 121. Thereafter, the electronic device 110 may remove the first object in operation 229. Further, the electronic device 110 may deactivate the second short range communication in operation 231. At this time, the electronic device 110 may deactivate the second short range communication while maintaining the activation of the first short range communication.

Figure 3:
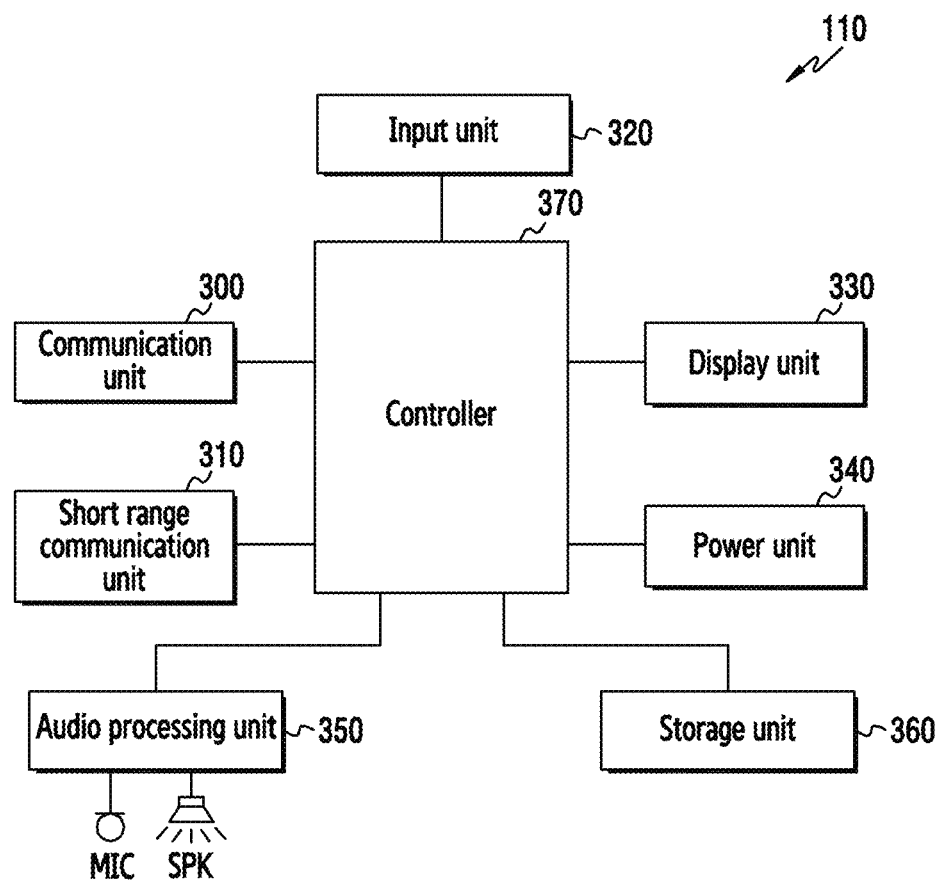
FIG. 3 illustrates a block diagram of an electronic device according to various embodiments.
Figure 4:
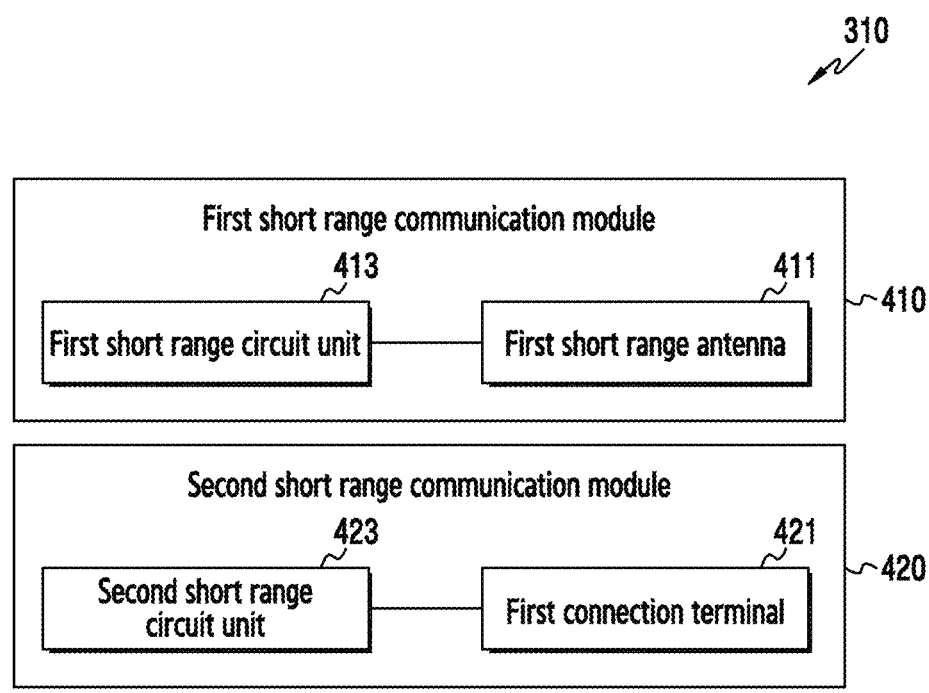
FIG. 4 illustrates a block diagram of a short range communication unit in an electronic device according to an embodiment.
Figure 5:
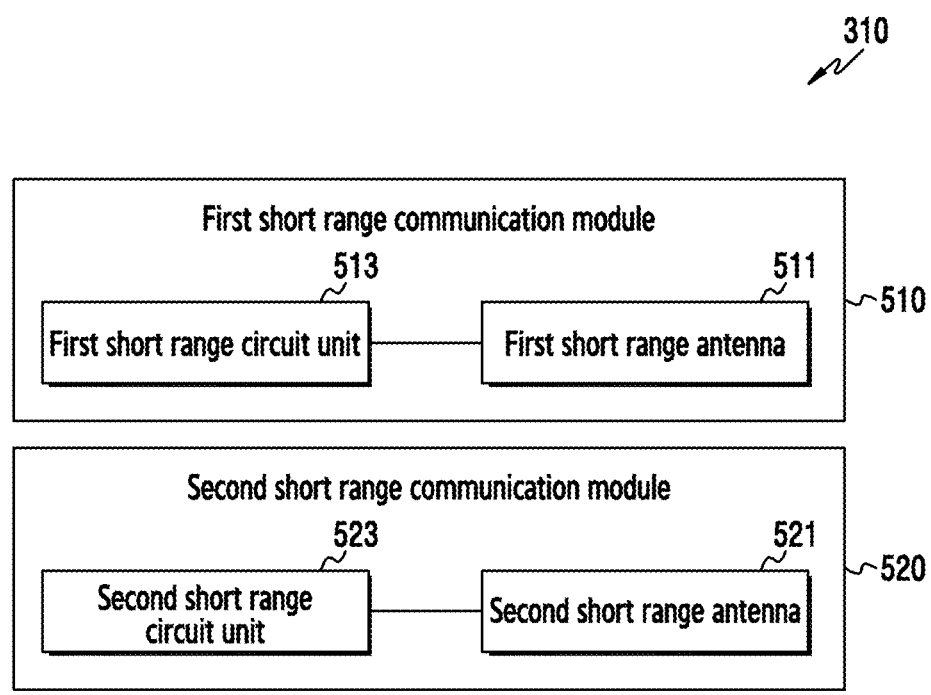
FIG. 5 illustrates a block diagram of a short range communication unit in an electronic device according to another embodiment.

FIG. 3 is a block diagram of an electronic device according to various embodiments. FIG. 4 is a block diagram of a short range communication unit in an electronic device according to an embodiment. FIG. 5 is a block diagram of a short range communication unit in an electronic device according to another embodiment.

Referring to FIG. 3, the electronic device 110 according to various embodiments may include a communication unit 300, a short range communication unit 310, an input unit 320, a display unit 330, a power unit 340, an audio processing unit 350, a storage unit 360, and a controller 370. According to various embodiments, at least one of the display unit 330 and the audio processing unit 350 may be used interchangeably with an output unit.

The communication unit 300 may perform communication in the electronic device 110. At this time, the communication unit 300 may communicate with at least one external device (not shown) through various communication schemes. The communication unit 300 may perform communication through a wire or wirelessly. Further, the external device may include, for example, an electronic device, a base station, a server, and a satellite. For example, the communication schemes may include a cellular communication scheme. The cellular communication scheme may include, for example, a Long Term Evolution (LTE) scheme, a Wideband Code Division Multiple Access (WCDMA) scheme, and a Global System for Mobile communications (GSM) scheme.

The short range communication unit 310 may perform short range communication in the electronic device 110. At this time, the communication unit 300 may communicate with at least one external device 120 through various short range communication schemes. For example, the short range communication schemes may include, for example, a Radio Frequency Identification (RFID) scheme, a Wi-Fi scheme, a wireless Local Area Network (LAN) scheme, a Bluetooth scheme, a Near Field Communication (NFC) scheme, and a Magnetic Secure Transmission (MST) scheme.

According to an embodiment, the short range communication unit 310 may include a first short range communication module 410 and a second short range communication module 420 as illustrated in FIG. 4.

The first short range communication module 410 may perform first short range communication. At this time, the first short range communication module 410 may perform the first short range communication with at least one external device 120. For example, the first short range communication module 410 may perform the first short range communication with the first external device 121. Further, the first short range communication module 410 may be driven in a first frequency band and perform the first short range communication. The first short range communication module 410 may include a first short range antenna 411 and a first short range circuit unit 413. The first short range antenna 411 may transmit and receive a signal for the first short range communication. The first short range circuit unit 413 may process a signal for the first short range communication.

The second short range communication module 420 may perform second short range communication. At this time, the second short range communication module 420 may perform the second short range communication with at least one external device 120. For example, the second short range communication module 420 may perform the second short range communication with the second external device 123 by using the first external device 121. Further, the second short range communication module 420 may be driven in a second frequency band and perform the second short range communication. The second short range communication module 420 may include a first connection terminal 421 and a second short range circuit unit 423. The first connection terminal 421 may transmit and receive a signal for the second short range communication. For example, the first connection terminal 421 may be electrically connected to the first external device 121. The second short range circuit unit 423 may process a signal for the second short range communication.

For example, the first short range communication and the second short range communication may be performed through the same scheme. The first short range communication and the second short range communication may be, for example, NFC. At least a part of a first frequency band an at least a part of a second frequency band may overlap each other. Alternatively, the first frequency band and the second frequency band may be separated from each other in a frequency domain. The first frequency band and the second frequency band may correspond to, for example, 13.56 MHz.

According to another embodiment, the short range communication unit 310 may include a first short range communication module 510 and a second short range communication module 520 as illustrated in FIG. 5.

The first short range communication module 510 may perform first short range communication. At this time, the first short range communication module 510 may perform the first short range communication with at least one external device 120. For example, the first short range communication module 510 may perform the first short range communication with first external device 121. Further, the first short range communication module 510 may be driven in a first frequency band and perform the first short range communication. The first short range communication module 510 may include a first short range antenna 511 and a first short range circuit unit 513. The first short range antenna 511 may transmit and receive a signal for the first short range communication. The first short range circuit unit 513 may process a signal for the first short range communication.

The second short range communication module 520 may perform second short range communication. At this time, the second short range communication module 520 may perform second short range communication with at least one external device 120. For example, the second short range communication module 520 may perform the second short range communication with the second external device 123. Further, the second short range communication module 520 may be driven in a second frequency band and perform the second short range communication. The second short range communication module 520 may include a second short range antenna 521 and a second short range circuit unit 523. The second short range antenna 521 may transmit and receive a signal for the second short range communication. The second short range circuit unit 523 may process a signal for the second short range communication.

For example, the first short range communication and the second short range communication may be performed through the same scheme. The first short range communication and the second short range communication may be, for example, NFC. At least a part of a first frequency band an at least a part of a second frequency band may overlap each other. Alternatively, the first frequency band and the second frequency band may be separated from each other in a frequency domain. The first frequency band and the second frequency band may correspond to, for example, 13.56 MHz.

The input unit 320 may generate input data in the electronic device 110. At this time, the input unit 320 may generate the input data according to a user input of the electronic device 110. Further, the input unit 320 may include at least one input means. The input unit 320 may include a key pad, a dome switch, a physical button, a touch panel, and a jog & shuttle.

The display unit 330 may output display data in the electronic device 110. The display unit 330 may be combined with the input unit 320 and implemented as a touch screen. For example, the display unit 330 may include a Liquid Crystal Display (LCD), a Light Emitting Diode (LED) display, an Organic LED (OLED) display, an Active Matrix Light Emitting Diode (AMOLED) display, a Micro ElectroMechanical System (MEMS) display, and an electronic paper display.

The power unit 340 may store power in the electronic device 110. Further, the power unit 340 may supply power to drive the electronic device 110. To this end, the power unit 340 may be repeatedly charged and discharged.

The audio processing unit 350 may process an audio signal in the electronic device 110. At this time, the audio processing unit 350 may include a speaker SPK and a microphone MIC. That is, the audio processing unit 350 may reproduce the audio signal output from the controller 370 through the speaker. Further, the audio processing unit 350 may transfer the audio signal generated from the microphone to the controller 370.

The storage unit 360 may store operation programs of the electronic device 110. According to various embodiments, the storage unit 360 may store a program for outputting at least one object in accordance with at least one external device 120. Further, the storage unit 360 may store data generated while the programs are executed. According to various embodiments, the storage unit 360 may store at least one object in accordance with identification data of the external device 120. For example, the storage unit 360 may store a first object in accordance with the identification data of the first external device 121 and store a second object in accordance with the identification data of the second external device 123.

The controller 370 may control the general operation of the electronic device 110. At this time, the controller 370 may perform various functions. To this end, the controller 370 may control the elements of the electronic device 110. Further, the controller 370 may receive commands or data from the elements of the electronic device 110 and process the received commands or data.

According to various embodiments, the controller 370 may detect an attachment or a connection of the first external device 121 through first short range communication. Through the detection, the controller 370 may output the first object corresponding to the first external device 121. At this time, the controller 370 may download the first object by using the identification data of the first external device 121. For example, the controller 370 may download the first object from the first external device 121 through the first short range communication modules 410 and 510. Alternatively, the controller 370 may download the first object from the server through the communication unit 300. Meanwhile, the controller 370 may determine the first object in the storage unit 360 by using the identification data of the first external device 121.

According to various embodiments, the controller 370 may detect an approach of the second external device 123 through second short range communication. Through the detection, the controller 370 may output a second object corresponding to the second external device 123. At this time, the controller 370 may download the second object by using identification data of the second external device 123. For example, the controller 370 may download the second object from the second external device 123 through the second short range communication module 420 or 520. Alternatively, the controller 370 may download the second object from the server through the communication unit 300. Meanwhile, the controller 370 may determine the second object in the storage unit 360 by using the identification data of the second external device 123.

At this time, in a state where the first external device 121 is mounted or connected, the controller 370 may detect an approach of the second external device 123. Through the detection, the controller 370 may individually apply the first object and the second object according to various functions. Alternatively, the controller 370 may combine the first object and the second object. For example, the controller 370 may apply the second object to the first object.

To this end, the controller 370 may activate the first short range communication. For example, the when the electronic device 110 is turned on, the controller 370 may continuously activate the first short range communication. That is, the controller 370 may turn on the first short range communication module 410 or 510. Further, when the first external device 121 is mounted or connected, the controller 370 may activate the second short range communication. For example, the controller 370 may activate the second short range communication while maintaining the activation of the first short range communication. That is, the controller 370 may turn on the second short range communication module 420 or 520.

Figure 6A:
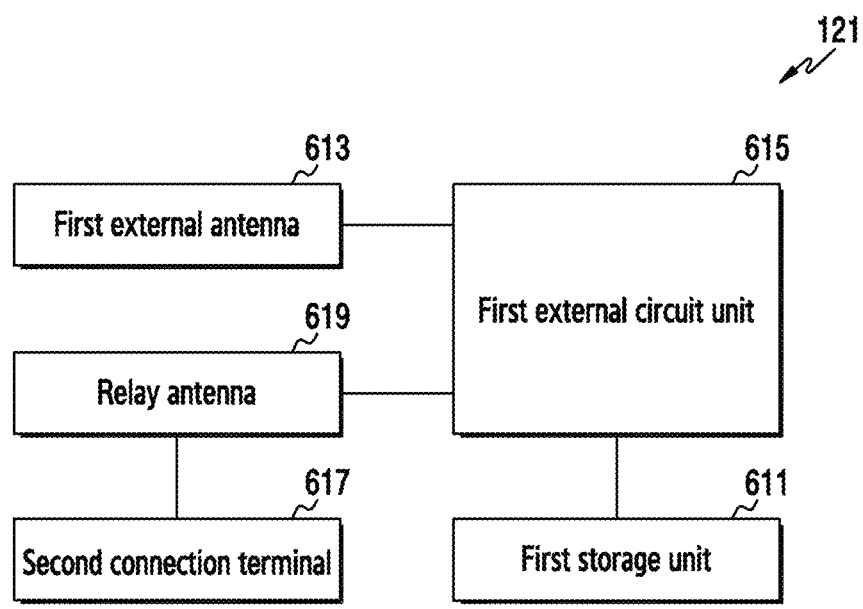
FIGS. 6A-6B and 7A-7B illustrate block diagrams of external devices according to various embodiments.
Figure 6B:
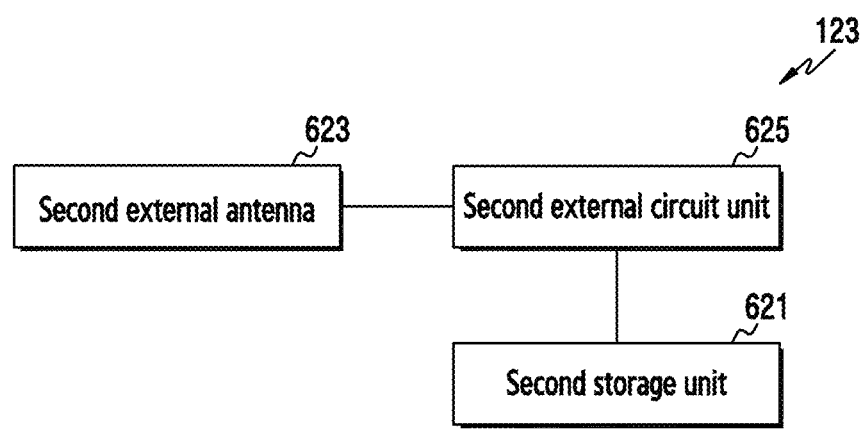
Figure 7A:
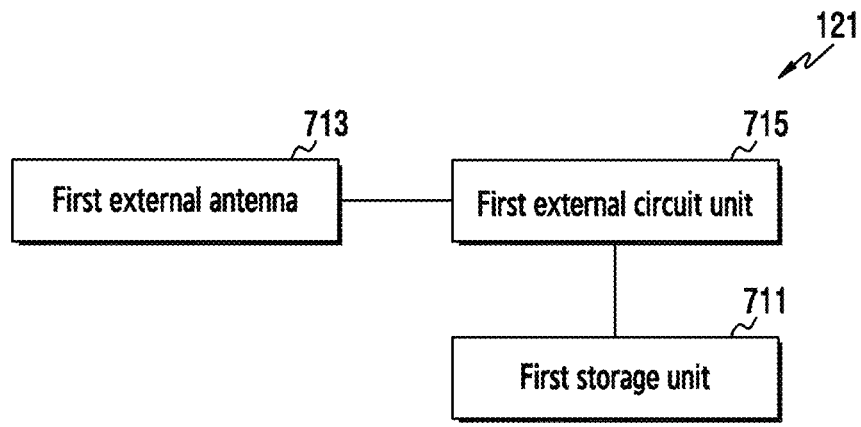
Figure 7B:
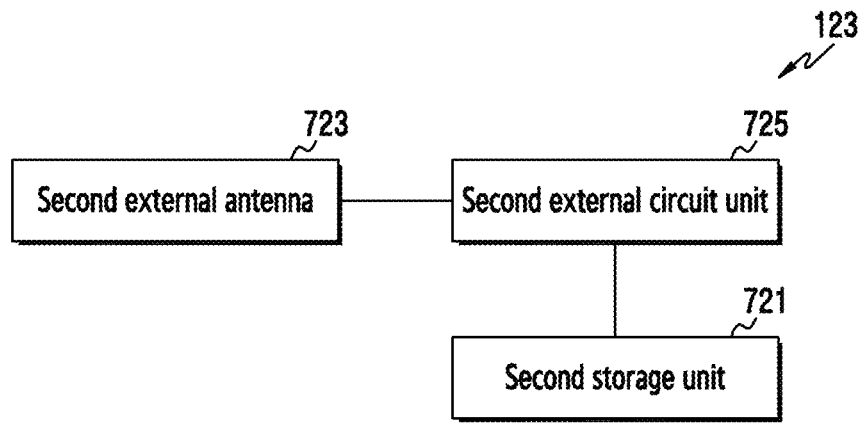
Figure 10D:
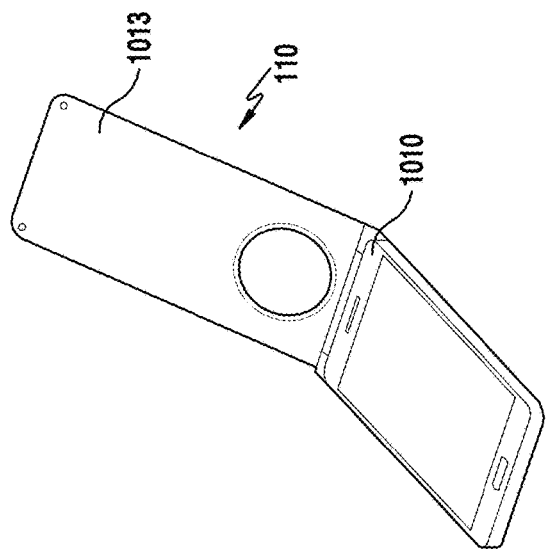
Figure 10C:
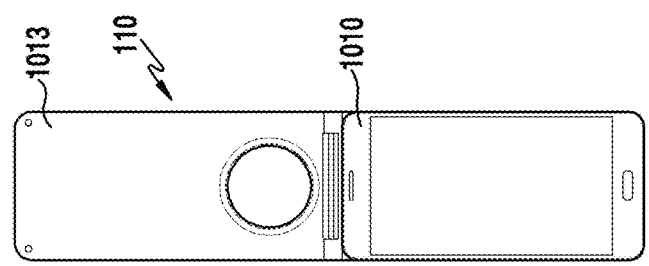
Figure 10A:
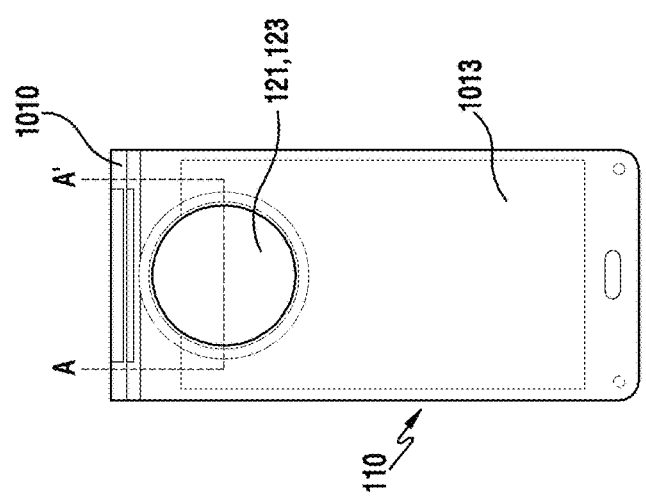
Figure 10B:
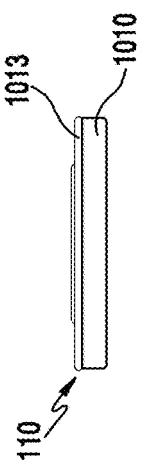
Figure 11D:
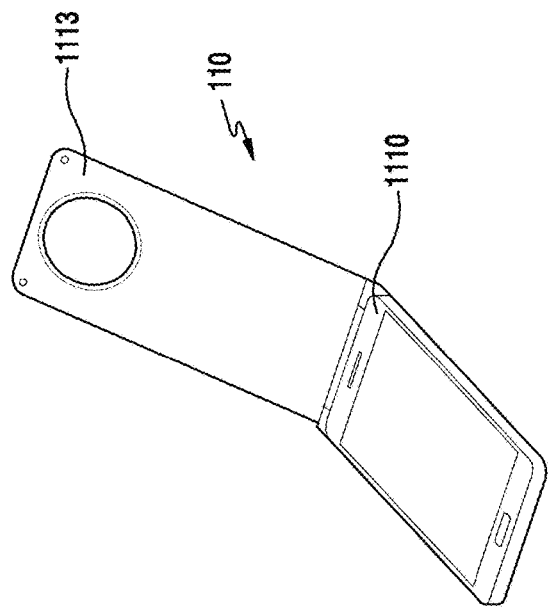
Figure 11C:
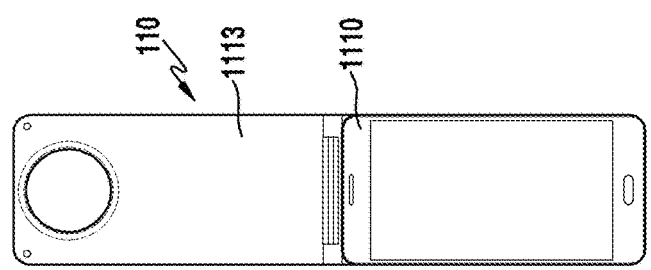
Figure 11A:
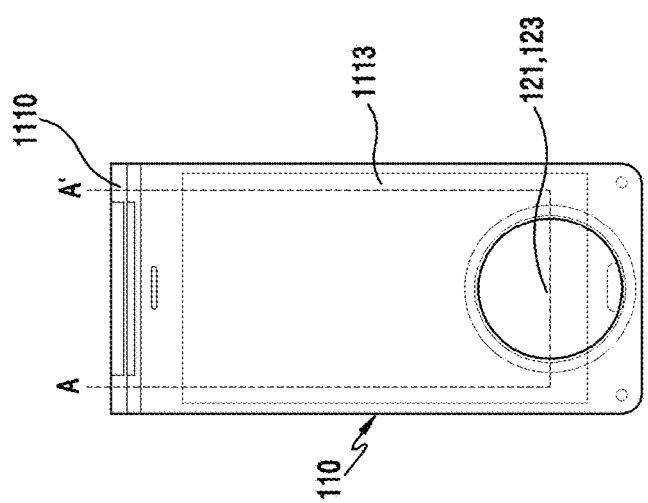
Figure 11B:
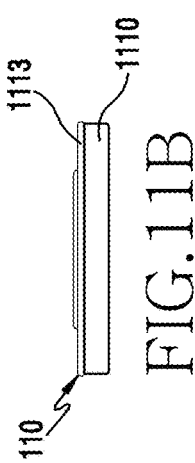

FIGS. 6 and 7 are block diagrams illustrating external devices according to various embodiments. At this time, FIGS. 6A and 7A are block diagrams illustrating a first external device and FIGS. 6B and 7B are diagrams illustrating a second external device.

Referring to FIGS. 6 and 7, the external devices 120 according to various embodiments may include the first external device 121 and the second external device 123. According to an embodiment, the first external device 121 and the second external device 123 may be differently implemented. According to another embodiment, the first external device 121 and the second external device 123 may be equally implemented.

The first external device 121 may perform first short range communication. For example, the first external device 121 may perform the first short range communication with the electronic device 110. Further, the first external device 121 may be driven in a first frequency band and perform the first short range communication.

The second external device 123 may perform second short range communication. For example, the second external device 123 may perform the second short range communication with the electronic device 110. Further, the second external device 123 may be driven in a second frequency band and perform the second short range communication.

According to an embodiment, the first external device 121 may include a first storage unit 611, a first external antenna 613, a first external circuit unit 615, a second connection terminal 617, and a relay antenna 619 as illustrated in FIG. 6A.

The first storage unit 611 may store identification data of the first external device 121. The first storage unit 611 may further store a first object. The first external antenna 613 may transmit and receive a signal for first short range communication. The first external circuit unit 615 may process the signal for the first short range communication. For example, the first external circuit unit 615 may process at least one of the identification data of the first external device 121 and the first object as the signal for the first short range communication, and transmit the signal to the first external antenna 613.

The second connection terminal 617 may transfer a signal for second short range communication. The second connection terminal 61 may be extended from the relay antenna 619. For example, the second connection terminal 617 may be electrically connected to the first connection terminal 421 of the electronic device 110. The relay antenna 619 may transmit and receive the signal for the second short range communication. For example, the second connection terminal 617 and the relay antenna 619 may be electrically separated from the first storage unit 611, the first external antenna 613, and the first external circuit unit 615. Accordingly, under a control of the second short range communication module 420 of the electronic device 110, the relay antenna 619 may transmit and receive the signal for the second short range communication.

According to an embodiment, the second external device 123 may include a second storage unit 621, a second external antenna 623, and a second external circuit unit 625 as illustrated in FIG. 6B.

The second storage unit 621 may store identification data of the second external device 123. The second storage unit 621 may further store a second object. The second external antenna 623 may transmit and receive a signal for second short range communication. The second external circuit unit 625 may process the signal for the second short range communication. For example, the second external circuit unit 625 may process at least one of the identification data of the second external device 123 and the second object as the signal for the second short range communication, and transmit the signal through the second external antenna 623.

According to another embodiment, the first external device 121 may include a first storage unit 711, a first external antenna 713, and a first external circuit unit 715 as illustrated in FIG. 7A.

The first storage unit 711 may store identification data of the first external device 121. The first storage unit 711 may further store a first object. The first external antenna 713 may transmit and receive a signal for first short range communication. The first external circuit unit 715 may process the signal for the first short range communication. For example, the first external circuit unit 715 may process at least one of the identification data of the first external device 121 and the first object as the signal for the first short range communication, and transmit the signal through the first external antenna 713.

According to another embodiment, the second external device 123 may include a second storage unit 721, a second external antenna 723, and a second external circuit unit 725 as illustrated in FIG. 7B.

The second storage unit 721 may store identification data of the second external device 123. The second storage unit 721 may further store a second object. The second external antenna 723 may transmit and receive a signal for second short range communication. The second external circuit unit 725 may process the signal for the second short range communication. For example, the second external circuit unit 725 may process at least one of the identification data of the second external device 123 and the second object as the signal for the second short range communication, and transmit the signal through the second external antenna 723.

FIGS. 8, 9, 10, 11, and 12 illustrate examples of an electronic device according to various embodiments. FIG. 13 illustrates examples of external devices according to various embodiments.

Referring to FIGS. 8, 9, 10, 11, and 12, the electronic device 110 and the external devices 120 according to various embodiments may be coupled to each other or physically connected to each other. The electronic device 110 may accommodate the external devices 120 along a predetermined axis. At this time, the first external device 121 may be inserted into the electronic device 110 along one axis, and the second external device 123 may be accumulated on the first external device 121 along one axis. To this end, the electronic device 110 may be implemented in various types.

According to an embodiment, the electronic device 110 may be implemented in an insertion type as illustrated in FIG. 8. For example, the electronic device 110 may include a housing 810. The housing 810 may be arranged outside the electronic device 110 and may combine and protect internal elements of the electronic device 110. At this time, an insertion unit 811 may be formed on one side of the housing 810. The insertion unit 811 may be extended into an inner side of the electronic device 110 while penetrating the side surface of the housing 810. Further, the housing 810 may include a coupling part 813. The coupling part 813 may accommodate the first external device 121 and the second external device 123. Further, the coupling part 813 may be inserted into the electronic device 110 through the insertion unit 811 in one direction, and may outwardly protrude from the electronic device 110.

According to another embodiment, the electronic device 110 may be implemented in a slide type as illustrated in FIG. 9. For example, the electronic device 110 may include a housing 910. The housing 910 may be arranged outside the electronic device 110 and may combine and protect internal elements of the electronic device 110. Further, the housing 910 may include a coupling part 913, The coupling part 913 may accommodate the first external device 121 and the second external device 123. The coupling part 913 may be slid in one direction on the back surface of the electronic device 110.

According to another embodiment, the electronic device 110 may be implemented in a folder type as illustrated in FIG. 10 or 11. For example, the electronic device 110 may include the housing 1010 or 1110. The housing 1010 or 1110 may be arranged outside the electronic device 110 and may combine and protect internal elements of the electronic device 110. Further, the housing 1010 or 1110 may include a coupling part 1013 or 1113. The coupling part 1013 or 1113 may accommodate the first external device 121 and the second external device 123. At this time, the coupling part 1013 or 1113 may accommodate the first external device 121 and the second external device 123 at various positions. Further, the coupling part 1013 or 1113 may rotate based on one axis in the housing 1010 or 1110.

Figure 12:
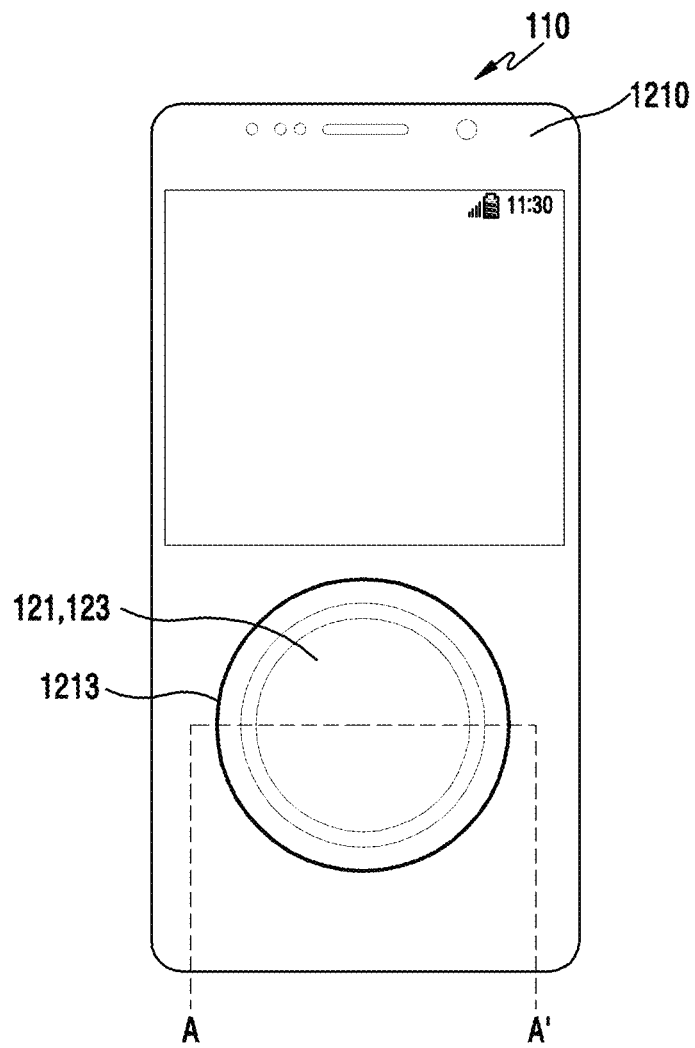
Figure 13:
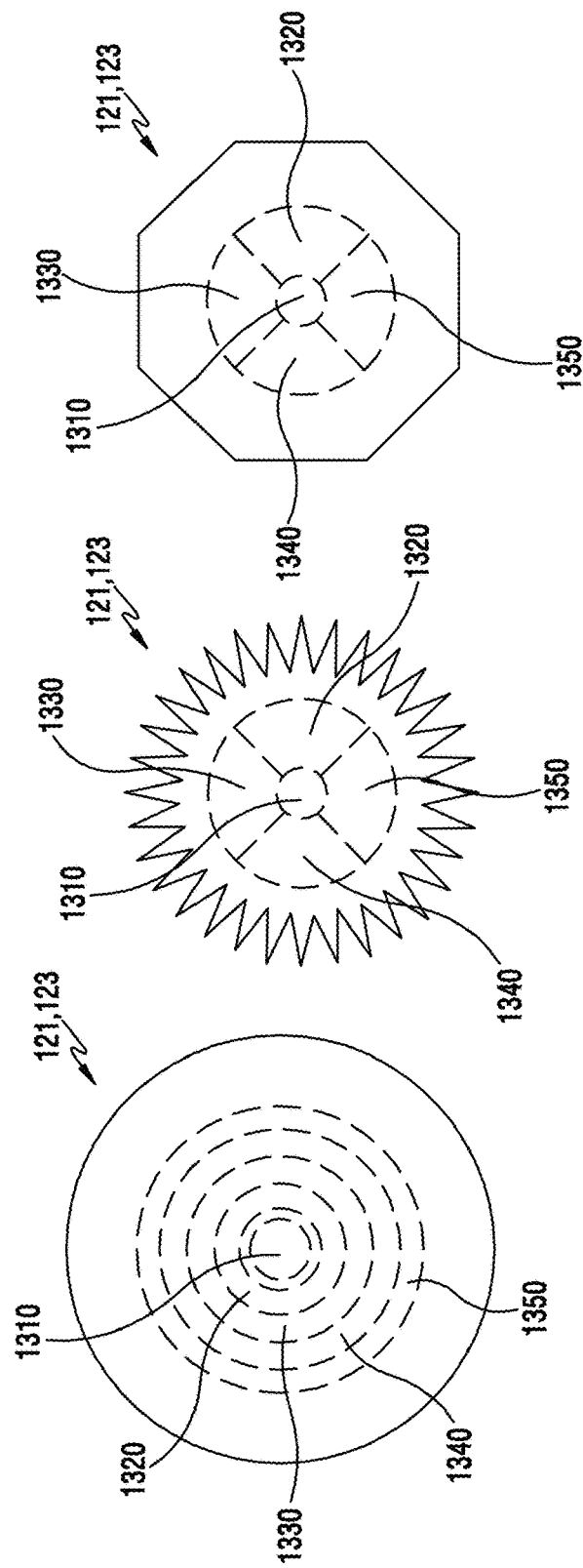
FIGS. 13A-13C illustrate examples of external devices according to various embodiments.

According to another embodiment, the electronic device 110 may be implemented in a fixed type as illustrated in FIG. 12. For example, the electronic device 110 may include a housing 1210. The housing 1210 may be arranged outside the electronic device 110 and may combine and protect internal elements of the electronic device 110. Further, the housing 1210 may include a coupling part 1213. The coupling part 1213 may accommodate the first external device 121 and the second external device 123. The coupling part 1213 may accommodate the first external device 121 and the second external device 123 at fixed locations of the electronic device 110.

According to various embodiments, the external devices 120 may be implemented in various forms as illustrated in FIG. 13. At this time, the external devices 120 may be implemented to be coupled to the coupling part 1213 of the electronic device 110 regardless of directions of the external devices 120. For example, the external devices 120 may be implemented in a circular shape (FIG. 13A), a toothed wheel shape (FIG. 13B), or a polygonal shape (FIG. 13C).

According to various embodiments, the external devices 120 may include a plurality of contact pads 1310, 1320, 1330, 1340, and 1350 arranged in various structures as illustrated in FIG. 13. The contact pads 1310, 1320, 1330, 1340, and 1350 may be electrically connected to the electronic device 110. To this end, the contact pads 1310, 1320, 1330, 1340, and 1350 may be exposed to the outside of the external devices 120. Further, the contact pads 1310, 1320, 1330, 1340, and 1350 may be arranged in various structures. For example, the contact pads 1310, 1320, 1330, 1340, and 1350 may be arranged in a radial structure. The contact pads 1310, 1320, 1330, 1340, and 1350 may include a power (Vcc) pad 1310, a clock (CLK; clock) pad 1320, a data pad 1330, a reset pad 1340, and a grounding pad 1350. Further, the contact pads 1310, 1320, 1330, 1340, and 1350 may be arranged in a predetermined order.

Meanwhile, the electronic device 110 may further include a plurality of connection pads (not shown) and a plurality of switch elements (not shown). The connection pads may be replaced with at least one of the first short range antenna 411 or 511, the first connection terminal 421, and the second short range antenna 521. The connection pads may be electrically connected to at least one of the external devices 120. The connection pads may be exposed to the coupling part 1213, Further, the connection pads may be arranged in various structures. The connection pads may be arranged in accordance with the structure of the contact pads 1310, 1320, 1330, 1340, and 1350 in the external devices 120. For example, the connection pads may be arranged in a radial structure. The switch elements may be connected to the connection pads, and may connect the connection pads to at least one of the first short range circuit unit 413 or 513 and the second short range circuit unit 423 or 523.

Accordingly, when at least one of the external devices 120 is accommodated in the coupling part 1213 of the electronic device 110, the contact pads 1310, 1320, 1330, 1340, and 1350 and the connection pads may be electrically connected. At this time, the controller 370 may set connection pads by controlling the switch elements. The controller 370 may set the connection pads as the power pad, the clock pad, the data pad, the reset pad, and the grounding pad. For example, the controller 370 may detect a grounding pad 1350 in the contact pads 1310, 1320, 1330, 1340, and 1350 and determine a power pad 1310, a clock pad 1320, a data pad 1330, and a reset pad 1340 based on the grounding pad 1350. Accordingly, the controller 370 may set one of the connection pads as the grounding pad in accordance with the grounding pad 1350 among the contact pads 1310, 1320, 1330, 1340, and 1350. Further, the controller 370 may set the remaining pads of the connection pads as the power pad, the clock pad, the data pad, and the reset pad based on the grounding pad. Accordingly, the electronic device 110 may be physically connected or coupled to the external devices 120 regardless of directions of the external devices 120.

FIGS. 14, 15, 16, and 17 are cross-sectional views cut along A-A' in FIGS. 8, 9, 10, 11, and 12.

Referring to FIGS. 14, 15, 16, and 17, the electronic device 110 and the external devices 120 according to various embodiments may be physically connected to be coupled to each other. The electronic device 110 may accommodate the external devices 120 along a predetermined axis. At this time, the first external device 121 may be inserted into the electronic device 110 along one axis, and the second external device 123 may be accumulated on the first external device 121 along one axis.

Figure 14:
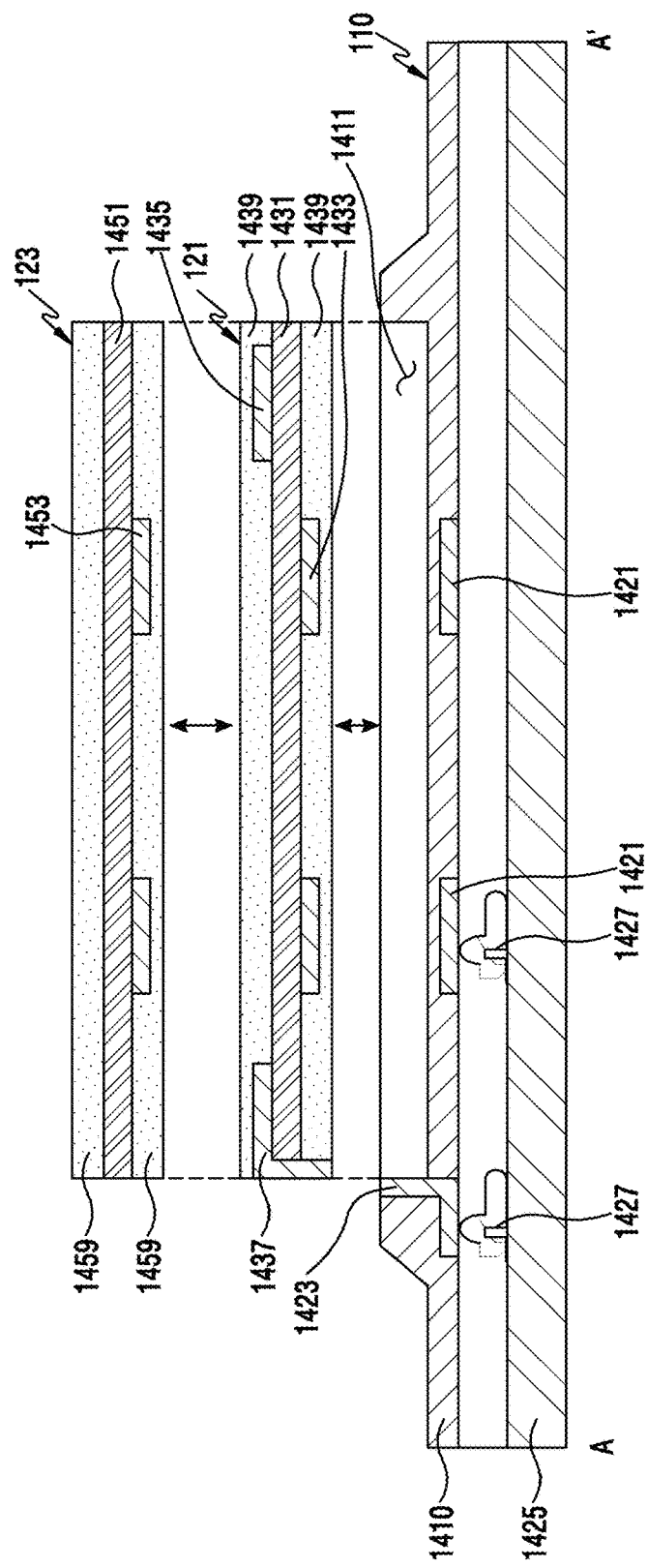
FIGS. 14, 15, 16, and 17 illustrate cross-sectional views cut along the line A-A' in FIGS. 7, 8, 9, 10, and 11.

According to an embodiment, the electronic device 110 may include a housing 1410, a first short range antenna 1421, a first connection terminal 1423, a driving substrate 1425, and an access part 1427 as illustrated in FIG. 14.

The housing 1410 may be arranged outside the electronic device 110 and may combine and protect internal elements of the electronic device 110. Further, the housing 1410 may include an accommodation part 1411. For example, the accommodation part 1411 may be formed as a groove in an external area of the housing 1410 and may be formed as a hole by penetrating the housing 1410.

The first short range antenna 1421 may be arranged inside the housing 1410 of the electronic device 110, Further, the first short range antenna 1421 may be arranged to correspond to the accommodation part 1411. For example, the first short range antenna 1421 may be arranged to face the internal area of the accommodation part 1411. At this time, the first short range antenna 1421 may correspond to the first short range antenna 411 illustrated in FIG. 4.

The first connection terminal 1423 may be arranged inside the housing 1410 of the electronic device 110, Further, the first connection terminal 1423 may be arranged to correspond to the accommodation part 1411. For example, the first connection terminal 1423 may be exposed to an internal area of the accommodation part 1411. At this time, the first connection terminal 1423 may correspond to the first connection terminal 421 illustrated in FIG. 4.

The driving substrate 1425 may include the elements of the electronic device 110. At this time, the driving substrate 1425 may include the first short range circuit unit 413 and the second short range circuit unit 423 illustrated in FIG. 4, For example, the driving substrate 1425 may include a Printed Circuit Board (PCB) and a Flexible PCB (FPCB).

The access part 1427 may electrically connect the first short range antenna 1421, the first connection terminal 1423, and the driving substrate 1425 in the electronic device 110 each other. At this time, the access part 1427 may connect the first short range antenna 1421 to the first short range circuit unit 413 of the driving substrate 1425. Further, the access part 1427 may connect the first connection terminal 1423 to the second short range circuit unit 423 of the driving substrate 1425. For example, the access part 1427 may include a C-clip.

According to an embodiment, the first external device 121 may include a first mounting member 1431, a first external antenna 1433, a relay antenna 1435, a second connection terminal 1437, and a first protecting member 1439.

The first mounting member 1431 may support the first external antenna 1433, the relay antenna 1435, and the second connection terminal 1437. For example, the first mounting member 1431 may be formed with one of polymer, amorphous, or ferrite. Although not illustrated, the first external circuit unit 615 illustrated in FIG. 6 may be mounted on the first mounting member 1431.

The first external antenna 1433 may be mounted on the first mounting member 1431 in the first external device 121. At this time, the first external antenna 1433 may be arranged to face the electronic device 110. Further, the first external antenna 1433 may correspond to the first external antenna 613 illustrated in FIG. 6.

The relay antenna 1435 may be mounted on the first mounting member 1431 in the first external device 121. At this time, the relay antenna 1435 may be arranged on the opposite side of the first external antenna 1433 in the first mounting member 1431. The relay antenna 1435 may be arranged to face the second external device 123. Further, the relay antenna 1435 may correspond to the relay antenna 619 illustrated in FIG. 6.

The second connection terminal 1437 may be mounted on the first mounting member 1431 in the first external device 121. At this time, the second connection terminal 1437 may be extended from the relay antenna 1435. Further, the second connection terminal 1437 may correspond to the second connection terminal 617 illustrated in FIG. 6.

The first protecting member 1439 may cover the first mounting member 1431, the first external antenna 1433, and the relay antenna 1435 in the first external device 121. Further, the first protecting member 1439 may expose the second connection terminal 1437. At this time, the first protecting member 1439 may expose the second connection terminal 1437 to face the accommodation part 1411 of the electronic device 110.

According to an embodiment, the second external device 123 may include a second mounting member 1451, a second external antenna 1453, and a second protecting member 1459 as illustrated in FIG. 14.

The second mounting member 1451 may support the second external antenna 1453. For example, the second mounting member 1451 may be formed with one of polymer, amorphous, or ferrite. Although not illustrated, the second external circuit unit 625 illustrated in FIG. 6 may be mounted on the second mounting member 1451.

The second external antenna 1453 may be mounted on the second mounting member 1451 in the second external device 123. At this time, the second external antenna 1453 may be arranged to face the electronic device 110. The second external antenna 1453 may be arranged to face the first external device 121. Further, the second external antenna 1453 may correspond to the second external antenna 623 illustrated in FIG. 6.

The second protecting member 1459 may cover the second mounting member 1451 and the second external antenna 1453 in the second external device 123.

Figure 15:
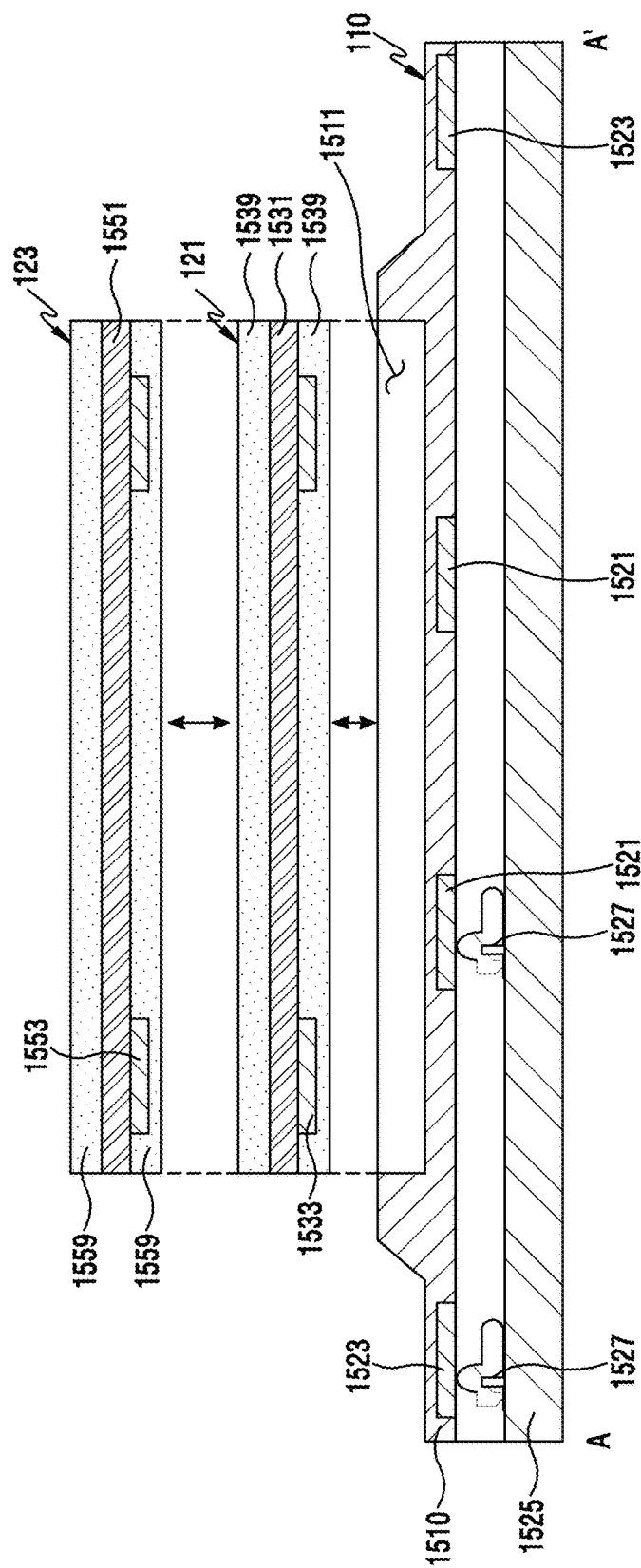

According to another embodiment, the electronic device 110 may include a housing 1510, a first short range antenna 1521, a second short range antenna 1523, a driving substrate 1525, and an access part 1527 as illustrated in FIG. 15.

The housing 1510 may be arranged outside the electronic device 110 and combine and protect internal elements of the electronic device 110. Further, the housing 1510 may include an accommodation part 1511. For example, the accommodation part 1511 may be formed as a groove in an external area of the housing 1510 or formed as a hole while penetrating the housing 1510.

The first short range antenna 1521 may be arranged inside the housing 1510 in the electronic device 110. Further, the first short range antenna 1521 may be arranged to correspond to the accommodation part 1511. For example, the first short range antenna 1521 may be arranged to face an internal area of the accommodation part 1511. At this time, the first short range antenna 1521 may correspond to the first short range antenna 511 illustrated in FIG. 5.

The second short range antenna 1523 may be arranged inside the housing 1510 in the electronic device 110. Further, the second short range antenna 1523 may be arranged to correspond to the accommodation part 1511. In addition, the second short range antenna 1523 may be arranged in an edge area of the first short range antenna 1521. For example, the second short range antenna 1523 may surround the first short range antenna 1521. The second short range antenna 1523 may be arranged to face an internal area of the accommodation part 1511. Alternatively, the second short range antenna 1523 may be arranged to be close to the accommodation part 1511 in an edge area of the accommodation part 1511. At this time, the second short range antenna 1523 may correspond to the second short range antenna 521 illustrated in FIG. 5.

The driving substrate 1525 may include the elements of the electronic device 110. At this time, the driving substrate 1525 may include the first short range circuit unit 513 and the second short range circuit unit 523 illustrated in FIG. 5. For example, the driving substrate 1525 may include a Printed Circuit Board (PCB) and a Flexible PCB (FPCB).

The access part 1527 may electrically connect the first short range antenna 1521, the second short range antenna 1523, and the driving substrate 1525 in the electronic device 110. At this time, the access part 1527 may connect the first short range antenna 1521 to the first short range circuit unit 513 of the driving substrate 1525. The access part 1527 may connect the second short range antenna 1523 to the second short range circuit unit 515 of the driving substrate 1525. For example, the access part 1527 may include a C-clip.

According to another embodiment, the first external device 121 may include a first mounting member 1531, a first external antenna 1533, and a first protecting member 1539 as illustrated in FIG. 15.

The first mounting member 1531 may support the first external antenna 1533. For example, the first mounting member 1531 may be formed with one of polymer, amorphous, or ferrite. Although not illustrated, the first external circuit unit 715 illustrated in FIG. 7 may be mounted on the first mounting member 1531.

The first external antenna 1533 may be mounted on the first mounting member 1531 in the first external device 121. At this time, the first external antenna 1533 may be arranged to face the electronic device 110. Further, the first external antenna 1533 may correspond to the first external antenna 713 illustrated in FIG. 7.

The first protecting member 1539 may cover the first mounting member 1531 and the first external antenna 1533 in the first external device 121.

According to another embodiment, the second external device 123 may include a second mounting member 1551, a second external antenna 1553, and a second protecting member 1559 as illustrated in FIG. 15.

The second mounting member 1551 may support the second external antenna 1553. For example, the second mounting member 1551 may be formed with one of polymer, amorphous, or ferrite. Although not illustrated, the second external circuit unit 725 illustrated in FIG. 7 may be mounted on the second mounting member 1551.

The second external antenna 1553 may be mounted on the second mounting member 1551 in the second external device 123. At this time, the second external antenna 1553 may be arranged to face the electronic device 110. The second external antenna 1553 may be arranged to face the first external device 121. Further, the second external antenna 1553 may correspond to the second external antenna 723 illustrated in FIG. 7.

The second protecting member 1559 may cover the second mounting member 1551 and the second external antenna 1553 in the second external device 123.

Figure 16:
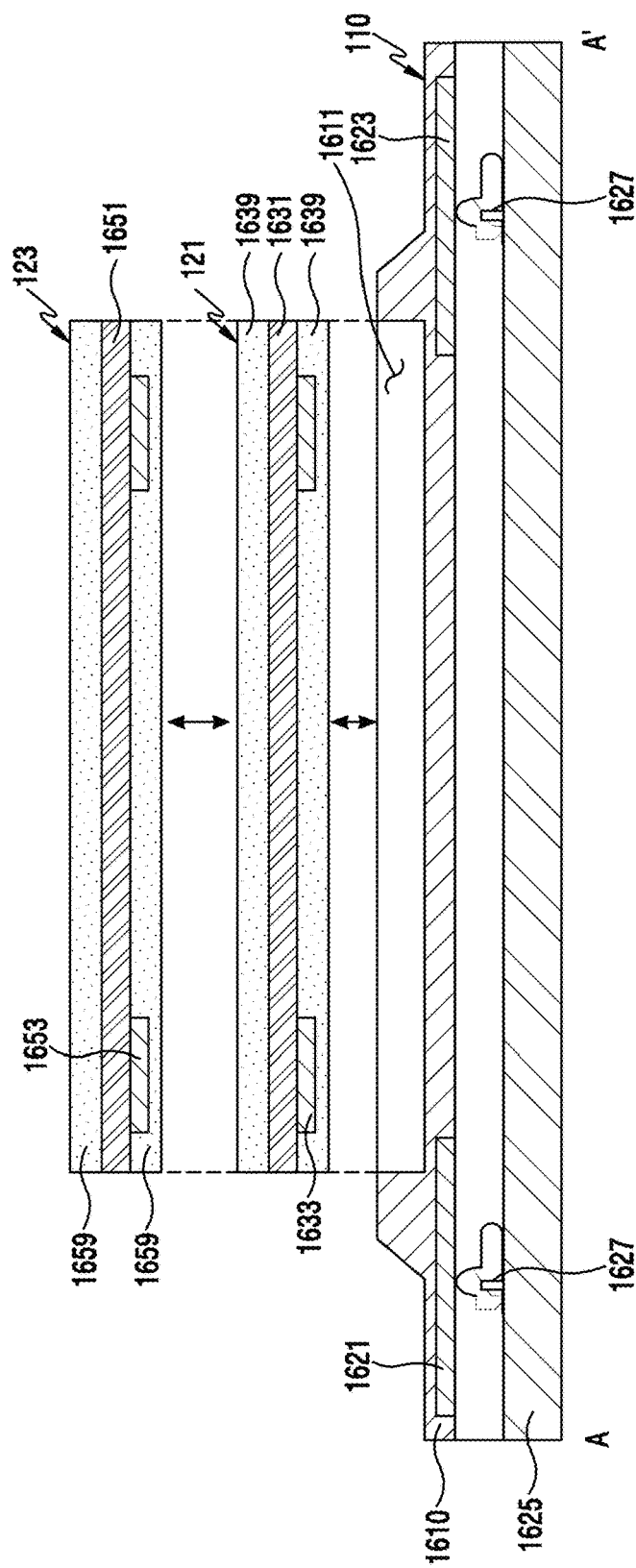

According to another embodiment, the electronic device 110 may include a housing 1610, a first short range antenna 1621, a second short range antenna 1623, a driving substrate 1625, and an access part 1627 as illustrated in FIG. 16. Further, the housing 1610 may include an accommodation part 1611. At this time, the housing 1610, the first short range antenna 1621, the second short range antenna 1623, the driving substrate 1625, and the access part 1627 illustrated in FIG. 16 may be similar to the housing 1510, the first short range antenna 1521, the second short range antenna 1523, the driving substrate 1525, and the access part 1527 illustrated in FIG. 15, For this reason, detailed descriptions of the housing 1610, the first short range antenna 1621, the second short range antenna 1623, the driving substrate 1625, and the access part 1627 may be omitted.

However, the first short range antenna 1621 and the second short range antenna 1623 may be arranged on opposite sides to each other. For example, the first short range antenna 1621 may be arranged to correspond to one side of the accommodation part 1611. Further, the second short range antenna 1623 may be arranged to correspond to the other side of the accommodation part 1611.

According to another embodiment, the first external device 121 may include a first mounting member 1631, a first external antenna 1633, and a first protecting member 1639 as illustrated in FIG. 16. At this time, the first mounting member 1631, the first external antenna 1633, and the first protecting member 1639 illustrated in FIG. 16 may be similar to the first mounting member 1531, the first external antenna 1533, and the first protecting member 1539 illustrated in FIG. 15. For this reason, detailed descriptions of the first mounting member 1631, the first external antenna 1633, and the first protecting member 1639 may be omitted.

According to another embodiment, the second external device 123 may include a second mounting member 1651, a second external antenna 1653, and a second protecting member 1639 as illustrated in FIG. 16. At this time, the second mounting member 1651, the second external antenna 1653, and the second protecting member 1659 illustrated in FIG. 16 may be similar to the second mounting member 1551, the second external antenna 1553, and the second protecting member 1559 illustrated in FIG. 15. For this reason, detailed descriptions of the second mounting member 1651, the second external antenna 1653, and the second protecting member 1659 may be omitted.

Figure 17:
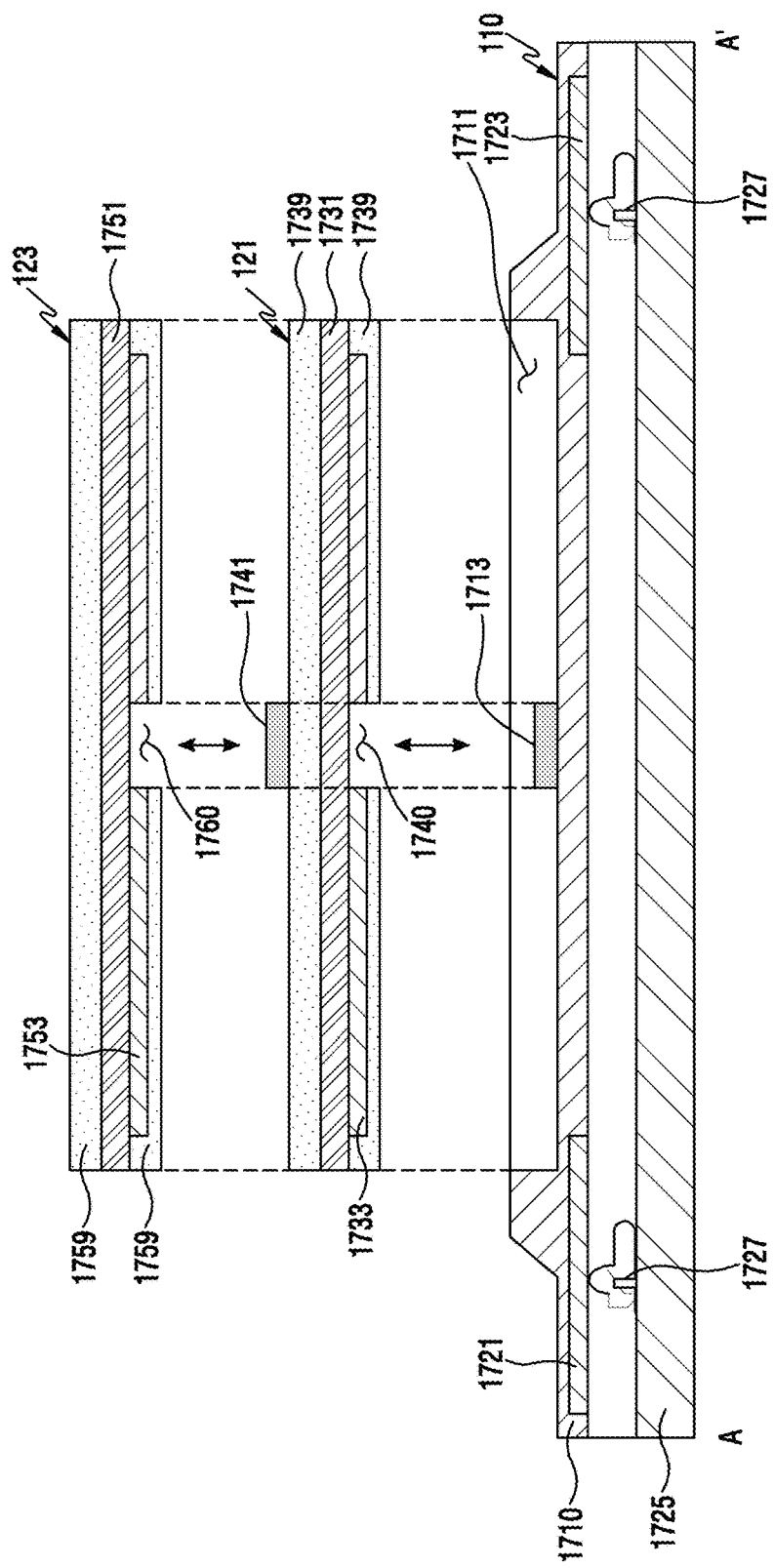

According to another embodiment, the electronic device 110 may include a housing 1710, a first short range antenna 1721, a second short range antenna 1723, a driving substrate 1725, and an access part 1727 as illustrated in FIG. 17. Further, the housing 1710 may include an accommodation part 1711. At this time, the housing 1710, the first short range antenna 1721, the second short range antenna 1723, the driving substrate 1725, and the access part 1727 illustrated in FIG. 17 may be similar to the housing 1510, the first short range antenna 1521, the second short range antenna 1523, the driving substrate 1525, and the access part 1527 illustrated in FIG. 15. Alternatively, the housing 1710, the first short range antenna 1721, the second short range antenna 1723, the driving substrate 1725, and the access part 1727 illustrated in FIG. 17 may be similar to the housing 1610, the first short range antenna 1621, the second short range antenna 1623, the driving substrate 1625, and the access part 1627 illustrated in FIG. 16. For this reason, detailed descriptions of the housing 1710, the first short range antenna 1721, the second short range antenna 1723, the driving substrate 1725, and the access part 1727 may be omitted.

However, the housing 1710 may further include a first connection part 1713. The first connection part 1713 may be arranged on the surface of the accommodation part 1711 in the electronic device 110. Further, the first connection part 1713 may protrude from the accommodation part 1711. At this time, the first connection part 1713 may protrude to face the first external device 121.

According to another embodiment, the first external device 121 may include a first mounting member 1731, a first external antenna 1733, and a first protecting member 1739 as illustrated in FIG. 17. At this time, the first mounting member 1731, the first external antenna 1733, and the first protecting member 1739 illustrated in FIG. 17 may be similar to the first mounting member 1531, the first external antenna 1533, and the first protecting member 1539 illustrated in FIG. 15. For this reason, detailed descriptions of the first mounting member 1731, the first external antenna 1733, and the first protecting member 1739 may be omitted.

However, a first separation part 1740 may be formed on the first external antenna 1733. At this time, the first separation part 1740 may penetrate the first external antenna 1733. That is, the first separation part 1740 may isolate the first external antenna 1733. Further, the first protecting member 1739 may open the first separation part 1740. That is, the first protecting member 1739 may cover the first mounting member 1731 and the first external antenna 1733 except for the first separation part 1740. Then, the first external antenna 1733 may be exposed by the first separation part 1740.

Accordingly, when the first external device 121 is mounted on the accommodation part 1711 of the electronic device 110, the first connection part 1713 of the electronic device 110 may be inserted into the first separation part 1740 of the first external device 121. Further, the first connection part 1713 of the electronic device 110 may be electrically connected to the first external antenna 1733 of the first external device 121. Accordingly, the first connection part 1713 of the electronic device 110 may be integrally driven with the first external antenna 1733 of the first external device 121.

Further, the first external device 121 may further include a second connection part 1741. The second connection part 1741 may be arranged on the surface of the first protecting member 1739. Further, the second connection part 1741 may protrude from the first protecting member 1739. At this time, the second connection part 1741 may protrude to face the second external device 123.

According to another embodiment, the second external device 123 may include a second mounting member 1751, a second external antenna 1753, and a second protecting member 1759 illustrated in FIG. 17. At this time, the second mounting member 1751, the second external antenna 1753, and the second protecting member 1759 illustrated in FIG. 17 may be similar to the second mounting member 1551, the second external antenna 1553, and the protecting member 1559 illustrated in FIG. 15. For this reason, detailed descriptions of the second mounting member 1751, the second external antenna 1753, and the second protecting member 1759 may be omitted.

However, a second separation part 1760 may be formed on the second external antenna 1753. At this time, the second separation part 1760 may penetrate the second external antenna 1753. That is, the second separation part 1750 may isolate the second external antenna 1753. Further, the second protecting member 1759 may open the second separation part 1760. That is, the second protecting member 1759 may cover the second mounting member 1751 and the second external antenna 1753 except for the second separation part 1760. Then, the second external antenna 1753 may be exposed by the second separation part 1760.

Accordingly, when the second external device 123 is mounted on the first external device 121, the second connection part 1741 of the first external device 121 may be inserted into the second separation part 1760 of the second external device 123. Further, the second connection part 1741 of the first external device 121 may be electrically connected to the second external antenna 1753 of the second external device 123. Accordingly, the second connection part 1741 of the first external device 121 may be integrally driven with the second external antenna 1753 of the second external device 123.

Figure 18:
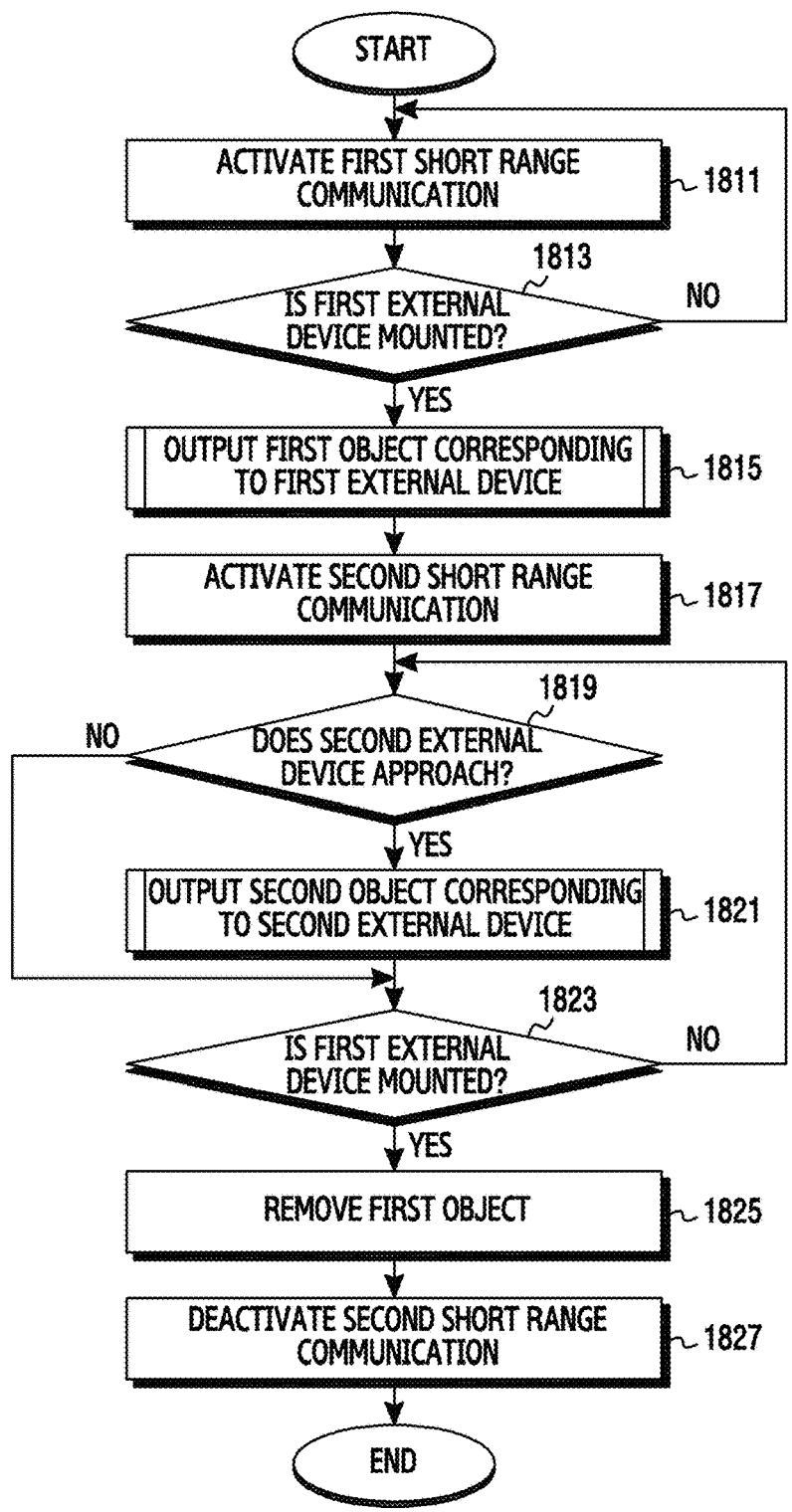
FIG. 18 is a flowchart illustrating an operation method of an electronic device according to various embodiments.

FIG. 18 is a flowchart illustrating an operation method of the electronic device according to various embodiments. FIG. 21 illustrates an example for describing an operation method of the electronic device according to various embodiments.

Referring to FIG. 18, the operation method of the electronic device 110 according to various embodiments may start from activation of first short range communication by the controller 370 in operation 1811. For example, when the electronic device 110 is turned on, the controller 370 may activate the first short range communication. Further, the controller 370 may maintain the activation of the first short range communication. That is, the controller 370 may turn on the first short range communication module 410 or 510.

Next, when the first external device 121 is mounted on the electronic device 110, the controller 370 may detect the mounting in operation 1813. At this time, the controller 370 may detect the mounting of the first external device 121 through first short range communication. For example, the first short range communication module 410 or 510 may broadcast a search message through the first short range communication. The first short range communication module 410 or 510 may periodically broadcast the search message. When receiving a response message from the first external device 121 through the first short range communication, the first short range communication module 410 or 510 may transfer the response message to the controller 370. Accordingly, the controller 370 may detect the mounting of the first external device 121 based on the first external device 121. Further, the electronic device 110 and the first external device 121 may be connected through the first short range communication. For example, the response message may include identification data of the first external device 121.

According to an embodiment, when the first external device 121 is mounted on the accommodation part of the electronic device 110, the first short range communication module 410 and the first external device 121 may be connected through the first short range communication. This is because the first external antenna 613 of the first external device 121 is located within a communicable range of the first short range antenna 411 of the first short range communication module 410. Further, the first connection terminal 421 of the second short range communication module 420 may be electrically connected to the second connection terminal 617 of the first external device 121.

According to another embodiment, when the first external device 121 is mounted on the accommodation part of the electronic device 110, the first short range communication module 510 and the first external device 121 may be connected through the first short range communication. This is because the first external antenna 713 of the first external device 121 is located within a communicable range of the first short range antenna 511 of the first short range communication module 510.

Subsequently, the controller 370 may output a first object corresponding to the first external device 121 in operation 1815. To this end, the controller 370 may detect the first object in accordance with the first external device 121. The controller 370 may detect the first object based on identification data of the first external device 121. For example, the controller 370 may download the first object from the first external device 121. Alternatively, the controller 370 may download the first object from the server. Meanwhile, the controller 370 may determine the first object in the storage unit 360.

Figure 19:
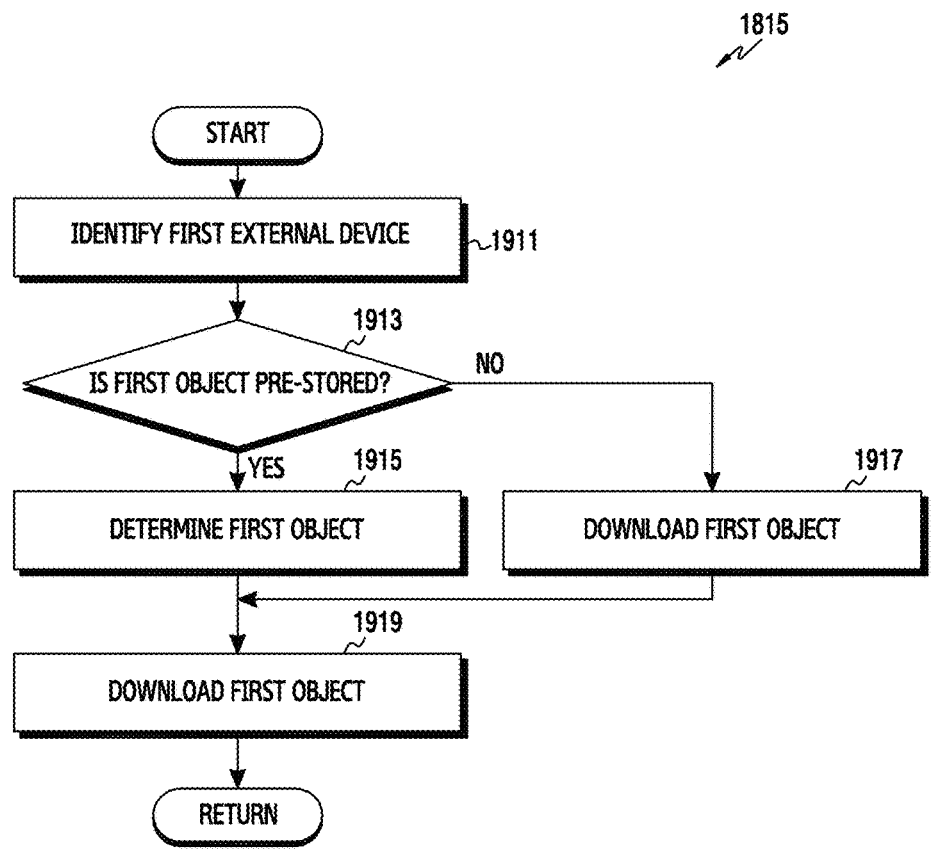
FIG. 19 is a flowchart illustrating an operation of outputting a first object corresponding to a first external device in FIG. 18.

FIG. 19 is a flowchart illustrating an operation of outputting the first object corresponding to the first external device in FIG. 18.

Referring to FIG. 19, the controller 370 may identify the first external device 121 in operation 1911. At this time, the controller 370 may detect identification data of the first external device 121. For example, the controller 370 may detect the identification data from a response message of the first external device 121.

Next, the controller 370 may determine whether the first object is pre-stored in accordance with the first external device 121 in operation 1913. At this time, the controller 370 may determine whether the first object exists in the storage unit 360 based on the identification data of the first external device 121.

Next, when it is determined that the first object is stored in operation 1913, the controller 370 may determine the first object in accordance with the first external device 121 in operation 1915. That is, the controller 370 may determine the first object from the storage unit 360.

Meanwhile, when it is determined that the first object is not pre-stored in operation 1913, the controller 370 may download the first object in accordance with the first external device 121 in operation 1917. At this time, the controller 370 may download the first object based on identification data of the first external device 121. For example, the controller 370 may download the first object from the first external device 121. The controller 370 may make a request for the first object to the first external device 121 and receive the first object from the first external device 121 in response to the request. Alternatively, the controller 370 may download the first object from the server. The controller 370 may transmit the identification data of the first external device 121 to the server to make a request for the first object, and receive the first object from the server in response to the request. Further, the controller 370 may store the first object in the storage unit 360 in accordance with the identification data of the first external device 121.

Figures 21A, 21B:
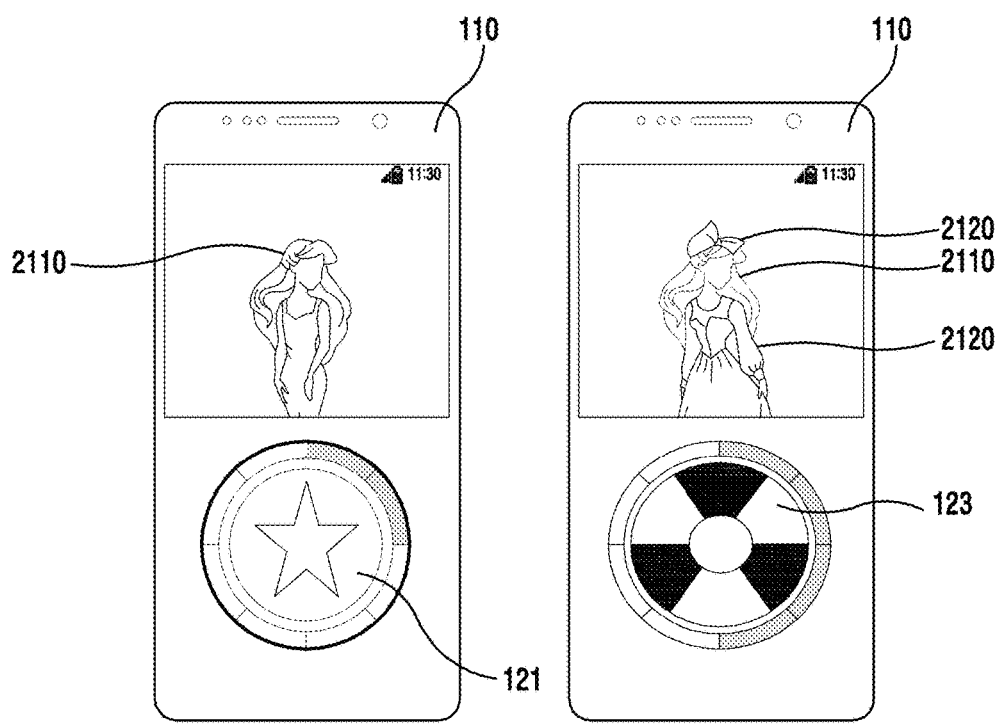
FIGS. 21A-21B illustrate examples for describing an operation method of an electronic device according to various embodiments.

Next, the controller 370 may output the first object in operation 1919. At this time, the controller 370 may apply the first object to at least one of various functions of the electronic device 110. The first object may include at least one of display data and audio data. For example, the first object may be an entire screen or may be a character 2110 displayed on the screen. When the first object is the character 2110, the controller 370 may display the character 2110 as illustrated in FIG. 21A. Further, the controller 370 may change the first object as one of the various functions is performed. For example, the controller 370 may change at least one of a facial expression, a motion, and a size of the character 2110. Thereafter, the controller 370 may return to FIG. 18.

Next, the controller 370 may activate second short range communication in operation 1817. At this time, the controller 370 may activate the second short range communication while maintaining the activation of the first short range communication. For example, when the first external device 121 is not detached from the electronic device 110, the controller 370 may activate the second short range communication. That is, the controller 370 may turn on the second short range communication module 420 or 520.

Next, when the second external device 123 approaches the electronic device 110, the controller 370 may detect the second external device 123 in operation 1819. At this time, the controller 370 may detect the approach of the second external device 123 through the second short range communication. When the second external device 123 is accumulated on the first external device 121, the controller 370 may detect the approach of the second external device 123. For example, the second short range communication module 420 or 520 may broadcast a search message through the second short range communication. The second short range communication module 420 or 520 may periodically broadcast the search message. When receiving a response message from the second external device 123 through the second short range communication, the second short range communication module 420 or 520 may transfer the response message to the controller 370. Accordingly, the controller 370 may detect the approach of the second external device 123 based on the second external device 123. For example, the response message may include identification data of the second external device 123.

According to an embodiment, when the second external device 123 approaches the accommodation part of the electronic device 110, the second short range communication module 420 and the second external device 123 may be connected through the second short range communication. This is because the second external antenna 623 of the second external device 123 is located within a communicable range of the relay antenna 619 of the first external device 121. Accordingly, when the second short range communication module 420 is turned on, the relay antenna 619 may be activated by the second short range communication module 420. Therefore, the second short range communication module 420 may perform the second short range communication through the relay antenna 619.

According to another embodiment, when the second external device 123 is mounted on the accommodation part of the electronic device 110, the second short range communication module 520 and the second external device 123 may be connected through the second short range communication. This is because the second external antenna 723 of the second external device 123 is located within the communicable range of the second short range antenna 521 of the second short range communication module 520.

Subsequently, the controller 370 may output a second object corresponding to the second external device 123 in operation 1821. To this end, the controller 370 may detect the second object in accordance with the second external device 123. The controller 370 may detect the second object based on identification data of the second external device 123. For example, the controller 370 may download the second object from the second external device 123. Alternatively, the controller 370 may download the second object from the server. Meanwhile, the controller 370 may determine the second object in the storage unit 360.

Figure 20:
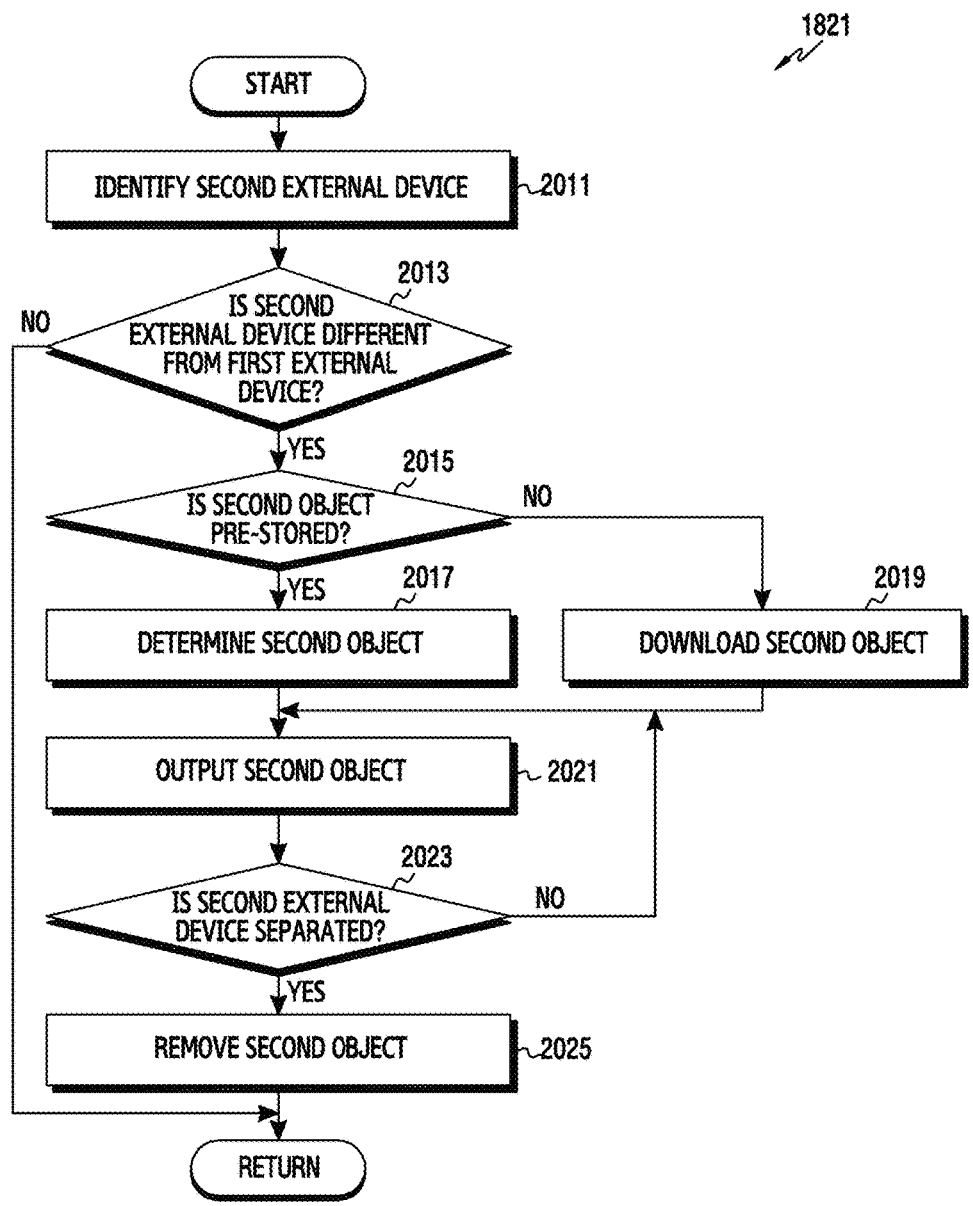
FIG. 20 is a flowchart illustrating an operation of outputting a second object corresponding to a second external device in FIG. 18.

FIG. 20 is a flowchart illustrating an operation of outputting the second object corresponding to the second external device in FIG. 18.

Referring to FIG. 20, the controller 370 may identify the second external device 123 in operation 2011. At this time, the controller 370 may detect identification data of the second external device 123. For example, the controller 370 may detect the identification data from a response message of the second external device 123.

Next, the controller 370 may determine whether the second external device 123 is different from the first external device 121 in operation 2013. To this end, the controller 370 may compare the identification data of the second external device 123 with the identification data of the first external device 121. For example, when the identification data of the second external device 123 is different from the identification data of the first external device 121, the controller 370 may determine that the second external device 123 is different from the first external device 121. Meanwhile, when the identification data of the second external device 123 is the same as the identification data of the first external device 121, the controller 370 may determine that the second external device 123 is the same as the first external device 121.

Next, when it is determined that the second external device 123 is different from the first external device 121 in operation 2013, the controller 370 may determine whether the second object is pre-stored in accordance with the second external device 123 in operation 2015. At this time, the controller 370 may determine whether the second object exists in the storage unit 360 based on the identification data of the second external device 123.

Next, when it is determined that the second object is stored in operation 2015, the controller 370 may determine the second object in accordance with the second external device 123 in operation 2017. That is, the controller 370 may determine the second object from the storage unit 360.

Meanwhile, when it is determined that the second object is not pre-stored in operation 2015, the controller 370 may download the second object in accordance with the second external device 123 in operation 2019. At this time, the controller 370 may download the second object based on the identification data of the second external device 123. For example, the controller 370 may download the second object from the second external device 123. The controller 370 may make a request for the second object to the second external device 123 and receive the second object from the second external device 123 in response to the request. Alternatively, the controller 370 may download the second object from the server. The controller 370 may transmit the identification data of the second external device 123 to the server to make a request for the second object, and download the second object from the server in response to the request. Further, the controller 370 may store the downloaded second object in the storage unit 360 in accordance with the identification data of the second external device 123.

Next, the controller 370 may output the second object in operation 2021. At this time, the controller 370 may apply the second object to at least one of various functions of the electronic device 110. The function for the second object may be the same as or different from the function for the first object. For example, when the function for the second object is the same as the function for the first object, the controller 370 may combine the first object and the second object. The second object may include at least one of display data and audio data. For example, the second object may be an entire screen or may be a character 2120 displayed on the screen. When the second object is the character 2120, the controller 370 may display the character 2120 as illustrated in FIG. 21B. The controller 370 may combine the character 2110 of the first object and the character 2120 of the second object. Further, the controller 370 may change the second object as one of the various functions is performed. For example, the controller 370 may change at least one of a facial expression, a motion, and a size of the character 2120.

Next, when the second external device 123 is separated from the electronic device 110, the controller 370 may detect the separation in operation 2023. At this time, the controller 370 may detect the separation of the second external device 123 through the second short range communication. For example, when the connection with the second external device 123 through the second short range communication is released, the second short range communication module 420 or 520 may notify the release of the connection to the controller 370. Accordingly, the controller 370 may detect the separation of the second external device 123. Further, the controller 370 may remove the second object in operation 2025. Thereafter, the controller 370 may return to FIG. 18.

According to an embodiment, when the second external device 123 is separated from the accommodation part of the electronic device 110, the connection between the second short range communication module 420 and the second external device 123 through the second short range communication may be released. This is because the second external antenna 623 of the second external device 123 escapes from a communicable range of the relay antenna 619 of the first external device 121. Accordingly, when the second short range communication module 420 is turned off, the relay antenna 619 may be deactivated by the second short range communication module 420.

According to another embodiment, when the second external device 123 is mounted on the accommodation part of the electronic device 110, the connection between the second short range communication module 520 and the second external device 123 through the second short range communication may be released. This is because the second external antenna 723 of the second external device 123 escapes from a communicable range of the second short range antenna 521 of the second short range communication module 520.

Meanwhile, when it is determined that the second external device 123 is the same as the first external device 121 in operation 2013, the controller 370 may return to FIG. 18. That is, the controller 370 may ignore the second external device 123.

Next, when the first external device 121 is detached from the electronic device 110, the controller 370 may detect the detachment in operation 1823. At this time, the controller 370 may detect the detachment of the first external device 121 through the first short range communication. For example, when the connection with the first external device 121 through the first short range communication is released, the first short range communication module 410 or 510 may notify the release of the connection to the controller 370. Accordingly, the controller 370 may detect the detachment of the first external device 121. Further, the controller 370 may remove the first object in operation 1825.

According to an embodiment, when the first external device 121 is detached from the accommodation part of the electronic device 110, the connection between the first short range communication module 410 and the first external device 121 through the first short range communication may be released. This is because the first external antenna 613 of the first external device 121 escapes from a communicable range of the first short range antenna 411 of the first short range communication module 410.

According to another embodiment, when the first external device 121 is detached from the accommodation part of the electronic device 110, the connection between the first short range communication module 510 and the first external device 121 through the first short range communication may be released. This is because the first external antenna 713 of the first external device 121 escapes from a communicable range of the first short range antenna 511 of the first short range communication module 510.

Lastly, the controller 370 may deactivate the second short range communication in operation 1827. At this time, the controller 370 may deactivate the second short range communication while maintaining the activation of the first short range communication. That is, the controller 370 may turn off the second short range communication module 420 or 520. Accordingly, the operation method of the electronic device 110 according to various embodiments may end.

Meanwhile, when the first external device 121 is not detached from the electronic device 110 in operation 1823, the controller 370 may return to operation 1819. At this time, the controller 370 may maintain the activation of the first short range communication and the second short range communication. The controller 370 may repeatedly perform at least some of operations 1819 to 1827.

According to various embodiments, the electronic device 110 may provide various interactions by accommodating at least one external device 120. That is, the electronic device 110 may variously express various operations by outputting objects corresponding to the external devices 120. Accordingly, the use efficiency and user convenience of the electronic device 110 can be enhanced.

Meanwhile, exemplary embodiments of the present disclosure shown and described in this specification and the drawings correspond to specific examples presented in order to easily explain technical contents of the present disclosure, and to help comprehension of the present disclosure, but are not intended to limit the scope of the present disclosure. That is, it is obvious to those skilled in the art to which the present disclosure belongs that different modifications can be achieved based on the technical spirit of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a housing comprising an accommodation part;
   a first short range communication module configured to perform first short range communication with a first external device mounted on the accommodation part; and
   a second short range communication module configured to perform second short range communication with a second external device accumulated on the first external device,
   wherein the first external device comprises a relay antenna for the second short range communication with the second external device.

2. The electronic device of claim 1, wherein the second short range communication module comprises a first connection terminal exposed through the accommodation part and electrically connected to the first external device.

3. The electronic device of claim 2, wherein the first external device comprises:
   a first short range antenna for the first short range communication with the first short range communication module; and
   a second connection terminal extended from the relay antenna and connected to the first connection terminal.

4. The electronic device of claim 3, wherein the second external device comprises a second short range antenna connected to the relay antenna for the second short range communication with the first external device.

5. The electronic device of claim 1, wherein the first short range communication module comprises a first short range antenna for the first short range communication.

6. The electronic device of claim 5, wherein the second short range communication module comprises a second short range antenna for the second short range communication.

7. The electronic device of claim 6, wherein one of the first short range antenna and the second short range antenna is arranged in an edge area of the other one.

8. The electronic device of claim 6, wherein the first short range antenna and the second short range antenna are arranged to face each other on the accommodation part.

9. An electronic device comprising:
   a first short range communication module configured to perform first short range communication;
   a second short range communication module configured to perform second short range communication;
   a controller functionally connected to the first short range communication module and the second short range communication module; and
   a display functionally connected to the controller,
   wherein the controller is configured to detect mounting of a first external device through first short range communication, output a first object corresponding to the first external device, detect an approach of a second external device, through second short range communication, and output a second object corresponding to the second external device,
   wherein the first external device comprises a relay antenna for the second short range communication with the second external device.

10. The electronic device of claim 9, wherein the controller is configured to output the first object and activates the second short range communication while maintaining activation of the first short range communication.

11. The electronic device of claim 10, wherein the controller is configured to detect a detachment of the first external device, remove the first object, and deactivate the second short range communication.

12. The electronic device of claim 9, wherein the controller is configured to apply the second object to the first object.

13. The electronic device of claim 9, wherein the controller is configured to determine that the second external device is different from the first external device, and determine the second object according to whether the second object corresponding to the second external device is stored or download the second object based on identification data of the second external device.

14. The electronic device of claim 9, wherein the controller is configured to determine the first object according to whether the first object corresponding to the first external device is stored or download the first object based on identification data of the first external device.

15. A method of operating an electronic device, the method comprising:
   detecting mounting of a first external device through first short range communication;
   outputting a first object corresponding to the first external device;
   detecting an approach of a second external device, through second short range communication; and
   outputting a second object corresponding to the second external device,
   wherein the first external device comprises a relay antenna for the second short range communication with the second external device.

16. The method of claim 15, wherein the outputting of the first object comprises:
   outputting the first object; and
   activating the second short range communication while maintaining activation of the first short range communication.

17. The method of claim 16, further comprising:
   detecting a detachment of the first external device;
   removing the first object; and
   deactivating the second short range communication.

18. The method of claim 15, wherein the outputting of the second object comprises applying the second object to the first object.

19. The method of claim 15, wherein the outputting of the second object comprises:
   determining that the second external device is different from the first external device; and
   detecting the second object according to whether the second object corresponding to the second external device is stored,
   wherein the detecting of the second object comprises:
   determining the stored second object; or
   downloading the second object based on identification data of the second external device.

20. The method of claim 15, wherein the outputting of the first object comprises detecting the first object according to whether the first object corresponding to the first external device is stored, and the detecting of the first object comprises:
determining the stored first object; or
downloading the first object based on identification data of the first external device.

* * * * *